United States Patent
Stryzhak

(10) Patent No.: US 10,214,701 B2
(45) Date of Patent: Feb. 26, 2019

(54) METHOD AND APPARATUS FOR PROCESSING OF CARBON-CONTAINING FEED STOCK INTO GASIFICATION GAS

(75) Inventor: Sergii Y. Stryzhak, Kiev (UA)

(73) Assignee: Rain Water, LLC, Ramona, CA (US)

( * ) Notice: Subject to any disclaimer, the term of this patent is extended or adjusted under 35 U.S.C. 154(b) by 1343 days.

(21) Appl. No.: 13/042,220

(22) Filed: Mar. 7, 2011

(65) Prior Publication Data
US 2012/0036778 A1 Feb. 16, 2012

Related U.S. Application Data

(60) Provisional application No. 61/314,002, filed on Mar. 15, 2010.

(51) Int. Cl.
| | |
|---|---|
| C10J 3/86 | (2006.01) |
| C10J 3/26 | (2006.01) |
| C10J 3/34 | (2006.01) |
| C10K 1/32 | (2006.01) |
| C10J 3/42 | (2006.01) |
| B01J 8/12 | (2006.01) |
| C10K 1/02 | (2006.01) |
| B01J 8/08 | (2006.01) |
| F23L 7/00 | (2006.01) |
| F23G 5/027 | (2006.01) |

(52) U.S. Cl.
CPC .............. *C10J 3/86* (2013.01); *B01J 8/087* (2013.01); *B01J 8/12* (2013.01); *C10J 3/26* (2013.01); *C10J 3/34* (2013.01); *C10J 3/42* (2013.01); *C10K 1/026* (2013.01); *C10K 1/32* (2013.01); *F23G 5/0276* (2013.01); *F23L 7/005* (2013.01); *B01J 2208/0053* (2013.01); *B01J 2208/00212* (2013.01); *C10J 2200/09* (2013.01); *C10J 2200/154* (2013.01); *C10J 2300/0903* (2013.01); *C10J 2300/0916* (2013.01); *C10J 2300/0946* (2013.01); *C10J 2300/0956* (2013.01); *C10J 2300/1671* (2013.01); *C10J 2300/1693* (2013.01); *C10J 2300/1884* (2013.01); *F23G 2201/303* (2013.01); *F23G 2900/50804* (2013.01)

(58) Field of Classification Search
CPC ............... C10J 3/26; C10J 3/466; C10J 3/467
USPC .......................................................... 48/61
See application file for complete search history.

(56) References Cited

U.S. PATENT DOCUMENTS

| | | | |
|---|---|---|---|
| 6,648,932 B1 | 11/2003 | Maton | |
| 2002/0159929 A1* | 10/2002 | Kaneko et al. | ............... 422/190 |

FOREIGN PATENT DOCUMENTS

| | | |
|---|---|---|
| EP | 0531778 | 3/1993 |
| EP | 0837120 | 4/1998 |

OTHER PUBLICATIONS

W. Chaiwat et al., Ind. Eng. Chem. Res. 2009 See abstract p. 8934-8936, Figure 1.
M. Dogru et al., Energy 27, 2002 See abstract p. 417-420, Figure 2.
(Continued)

*Primary Examiner* — Matthew Merkling
(74) *Attorney, Agent, or Firm* — Allan Litovsky

(57) ABSTRACT

The invention relates to chemical technology and equipment, in particular to apparatuses of processing of solid household and industrial waste, as well as other carbon-containing feedstock into combustible gasification gas and methods for pyrolysis and downdraft gasification process.

7 Claims, 3 Drawing Sheets

(56) References Cited

OTHER PUBLICATIONS

S.G. Hong et al., The Korean Society of Agricultural Engineeres, 2008 See abstract, p. 90-93, Figures 1 and 2.
Form PCT/ISA/210 in connection with PCT/US2011/026418 dated Oct. 28, 2011.
Form PCT/ISA/237 in connection with PCT/US2011/026418 dated Oct. 28, 2011.

* cited by examiner

METHOD AND APPARATUS FOR PROCESSING OF CARBON-CONTAINING FEED STOCK INTO GASIFICATION GAS

This application claims the priority of U.S. Provisional Patent Application Ser. No. 61/314,002 filed on Mar. 15, 2010, which is incorporated herein by reference in its entirety herein.

The invention relates to chemical technology and equipment, in particular, to processes and apparatuses for processing of solid household and industrial waste, fossil fuels as well as other carbon-containing feedstock into gasification gas by use of pyrolysis and downdraft gasification processes.

BACKGROUND

The downdraft gasification process has a number of advantages compared to the updraft gasification process, which is the process typically used in modern technologies for processing of carbon-containing feedstock. One such advantage of the downdraft gasification process is that process tars, acids and steam, which are formed in a low temperature pyrolysis zone, go through the combustion and reforming zones where, under the exposure to high temperatures, they reach almost a complete conversion into gasification gases. This makes it possible to use said gases for production of electric energy in gas-diesel engines, gas powered engines or gas turbines, for example, with minimal costs for cooling and purification of said gases.

At the same time, the traditional downdraft gasification process is characterized by some disadvantages that have prevented a more widespread use of that process. Some of the disadvantages of the traditional downdraft gasification process that have been described in the technical and scientific literature are: (1) the impossibility of use of the downdraft process for processing of plasticizing and coking feedstock with high content of volatile components due to the chocking-up of the feedstock in a bunker for drying and low temperature pyrolysis, which, in turn, results in an unstable gasification process followed by its complete shutdown; (2) the impossibility to operate with feedstock having fine or large fraction, feedstock representing aggregate pressed body, or feedstock with high ash content having low temperature of ash melting; (3) the necessity to shut-down the process for periodic loading or additional loading of feedstock, its manual crushing and pushing through (which is has been referred to as "poking"), (4) the need for periodic removal of residual ash and/or slag residue; (5) heterogeneity of v and compositions of the produced gases due to the stoppage for loading of the feedstock, which makes it more difficult to utilize such gases; (6) a low relative productivity of gasifiers caused by the air flow supply with parameters that do not allow to start the intensive slag formation process; (7) production of toxic inorganic ash residuals; (8) inability to effectively utilize the heat of the produced gases for improving the gasifier efficiency; and (9) significant heat losses.

SUMMARY

The following is a summary description of illustrative embodiments of the invention. It is provided as a preface to assist those skilled in the art to more rapidly assimilate the detailed discussion, which ensues, and is not intended in any way to limit the scope of the claims, which are appended hereto in order to particularly point out the invention.

One embodiment of the apparatus of the instant invention comprises an external vessel and an external vessel, wherein the internal vessel is located inside the external vessel, thereby forming a void between the internal and external vessels. The apparatus also comprises a loading mechanism with an elongated loading mechanism trunk and a feedstock feeder for moving the feedstock along the elongated loading mechanism trunk. The apparatus further comprises a gasifier trunk, a fire chamber, a gas outlet and a slag discharge mechanism.

The operation of the apparatus described above comprises a continuous supply of feedstock into the gasifier trunk, where the feedstock is supplied under pressure created by the loading mechanism, which causes a movement of the feedstock along the loading mechanism trunk and the gasifier trunk and allows for unhindered passage of the formed gases and residual carbon through all processing zones followed by the cooling, mechanical crushing and removal of slag.

One embodiment of the new method of the instant invention comprises the steps of providing a loading mechanism trunk, providing a drying zone, providing a plasticization zone, providing a pyrolysis zone, providing a combustion zone, providing a reforming zone, providing a slag discharge zone, supplying feedstock, forcing said feedstock through said loading mechanism trunk as well as through each of said drying zone, pyrolysis zone, combustion zone, reforming zone, and slag discharge zone with a loading a loading mechanism that comprises an elongated loading mechanism trunk and a feedstock feeder. Said method further comprises the steps of causing said feedstock to form a plug that substantially hermetically separates said drying zone, said plasticization zone, said pyrolysis zone, said combustion zone, said reforming zone and said slag discharge zone from the atmosphere and causing formation and separation of steam from said feedstock in said drying zone, causing pyrolysis gases to form in said pyrolysis zone, separating substantially all of said pyrolysis gases from said feedstock in said pyrolysis zone, thereby causing separation of carbon char residue and forming gasification gases.

DETAILED DESCRIPTION

The present invention relates to a method and apparatus for processing carbon-containing feedstock into gasification gases. The following description is presented to enable one of ordinary skill in the art to make and use the invention and is provided in the context of this description and its requirements. Although the present invention will be described in the context of a method and apparatus for processing household and industrial waste, various modifications to the preferred embodiment will be readily apparent to those skilled in the art, and the principles described herein may be applied to other carbon-containing feedstock, embodiments of the apparatus and modifications of the method.

The present invention allows to process feedstock with various morphological structures, fractioned composition, and increased moisture content that was impossible to reliably and efficiently process in a downdraft process by the previously-known methods.

Figure 1:
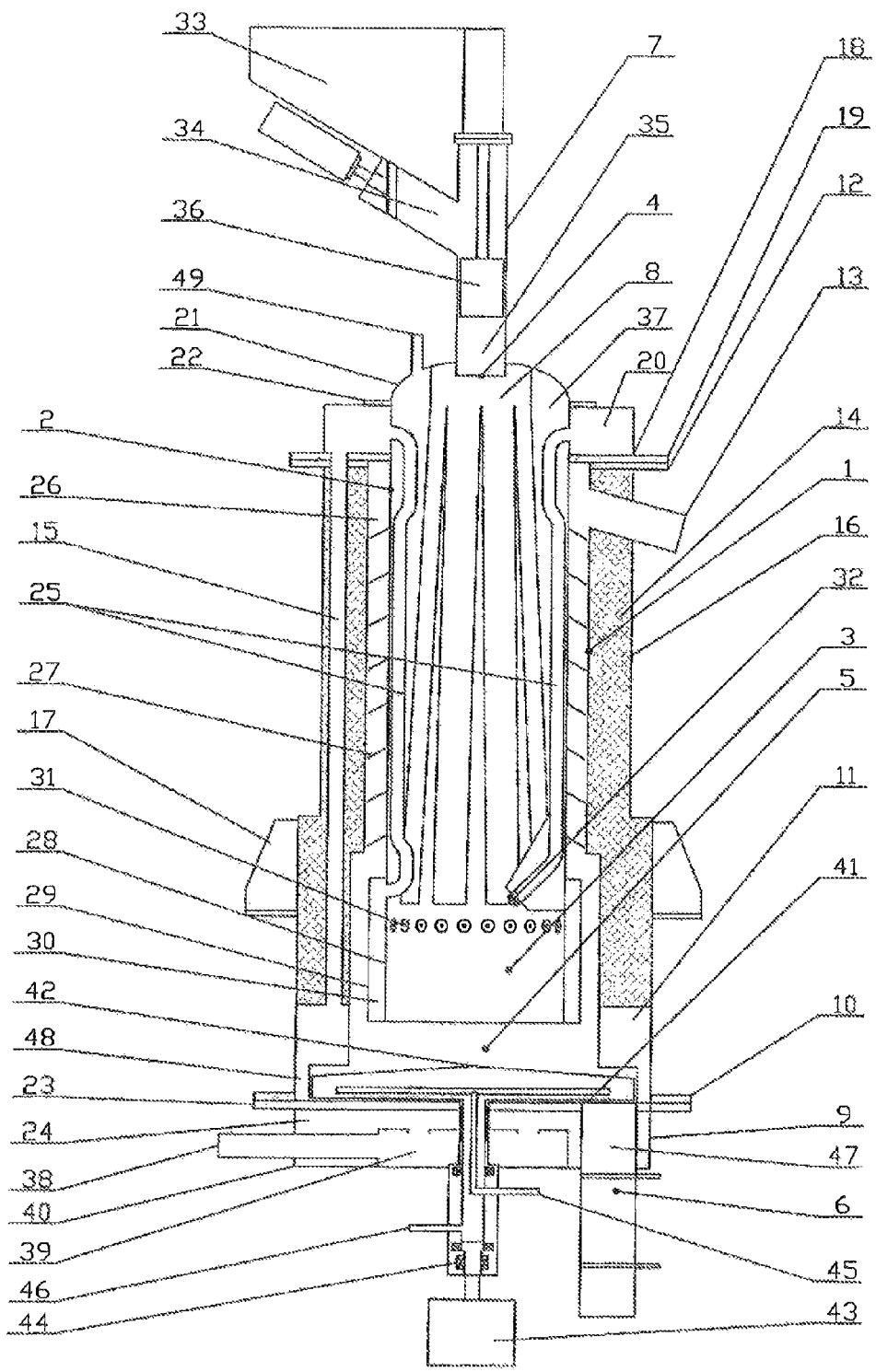
FIG. 1 presents a schematic depiction of an apparatus pursuant to one embodiment of the present invention.

Referring to FIG. 1, one embodiment of the apparatus of the present invention comprises: external vessel 1, internal vessel 2, fire chamber 3, loading mechanism trunk 4, and slag discharge mechanism 5.

The external vessel 1 is preferably made of sheet heat-resistant steel in a form of a cylinder, but it may be made of another heat-resistant material and may have a non-cylindrical shape. Cooling flange 10 is attached to the lower end of external vessel 1 with preferably annular air cooling channel 11. Flange 12 is attached to the upper end of external vessel 1. Gas outlet 13, preferably characterized by a rectangular or round cross-section, is positioned tangentially to external vessel 1. Gas outlet 13 is intended for discharging produced gasification gases from the apparatus of the instant invention.

Thermal jacket 14 is preferably positioned on the outer surface of external vessel 1. Air channels 15 are formed in thermal jacket 14. Thermal isolation jacket 14 is preferably equipped with external casing 16 and landing pads 17. In an alternative embodiment, external casing 16 may be fabricated as two cylindrical shells of different diameter connected together by a rigid concentric bridge and attached to lower flange 10. Cover 18 is attached to upper Flange 12. Flange 19 is positioned on the lower portion of cover 18. Air distribution box 20 is attached to the upper surface of flange 19. Flange 19 is coupled with flange 12. Flange 19 is also connected to the upper portion of internal vessel 2.

The body 9 of slag discharge mechanism 5 is attached to lower flange 10. Flange 23 with air cooling channel 24 is positioned above slag discharge mechanism 5. Air channels 48 pass through flanges 10 and 23 and connect air cooling channels 11 and 24.

In this embodiment, internal vessel 2 is characterized by a cylindrical shape and is made of sheet heat-resistant steel. Internal vessel 2 is positioned inside external vessel 1. Internal vessel 1 and external vessel 2 are connected through flange 19. Gas channel 26 is located between external vessel 1 and internal vessel 2.

Cover 21 is connected to the upper portion of internal vessel 2 through flange 22 with the air distribution shell 20. Fire chamber 3 is located in the lower portion of internal vessel 2. Gasifier trunk 8 is located inside internal vessel 2. Air supply channels 25 located inside internal vessel 2 connect air distribution shell 20 with fire chamber 3. Pipes may be used to form air supply channels 25. Blades of turbulator 27 are formed on the outer surface of internal vessel 2.

In the preferred embodiment, fire chamber 3 is molded of heat-resistant steel. Alternatively, fire chamber 3 may have a welded structure or may be another suitable manner. Fire chamber 3 is characterized by internal wall 28 and external wall 29. Further, in the preferred embodiment, fire chamber 3 is composed of cylindrical shells fixed together by concentric insertions forming an internal volume—under-tuyere bend 30 connected with air distribution shell 20 by air supply channels 25.

Internal wall 28 of fire chamber 3 may have a shape of a truncated cone with a wider diameter at its bottom. Heat-resistant coating may be applied to the external surface of fire chamber 3. External tuyeres 31 may be constructed as nozzles around the circumference of internal wall 28.

Internal tuyeres 32 are placed in the central portion of fire chamber 3 at an angle to the walls of internal vessel 2. Internal tuyeres 32 connected to air distribution shell 20 by air supply channels 25.

Loading mechanism 7 comprises receiving bunker 33, feedstock supply channel 34 and loading mechanism trunk 35. Loading mechanism may be equipped with piston 36 or a suitable mechanical drive of another design. In the preferred embodiment, gasifier trunk 8 is placed inside internal vessel 2 such that the axis of gasifier trunk 8 substantially coincides with the axis of loading mechanism trunk 35 and the lower opened edge 4 of loading mechanism trunk 35 is positioned at the level or slightly below the upper edge of gasifier trunk 8. The diameter of the loading mechanism trunk 35 is lesser than the diameter of gasifier trunk 8.

In an alternative embodiment, a portion of loading mechanism trunk 35 that is located above cover 21 can be equipped with a cooler. Gasifier trunk 8 is formed as a truncated cone widened to the bottom. Degassing slits are preferably formed in the walls of gasifier trunk 8. The degassing slits are preferably cut through the entire length of the walls of gasifier trunk 8, but may leave uncut portions, preferably closer to the mid-portion of gasifier trunk 8. In the preferred embodiment, degassing slits are wider toward the lower end of gasifier trunk 8. The diameter of the bottom portion of gasifier trunk 8 is lesser than the diameter of internal vessel 2.

In the preferred embodiment, gasifier trunk 8 is reinforced along its length with steel rings of various diameters attached to the outside surface of gasifier trunk 8. Such steel rings serve as rigidity structures. If the shape of the gasifier trunk is different, the rigidity structures will conform to the shape of the gasifier trunk. For example, if the gasifier trunk is octagonal, than the rigidity structures will be octagonal too. In addition, in the preferred embodiment, gasifier trunk 8 is equipped with rigidity ribs positioned on the wall segments separated by the degassing slits.

Damping chamber 37 is formed between internal vessel 2 and gasifier trunk 8.

Slag discharge mechanism 5 includes cylindrical body 9. Flange 23 is attached to the upper portion of cylindrical body 9. Flange 23 is equipped with air channels 48. Air distribution box 39 is attached to the inside surface of bottom 40 of slag discharge mechanism 5. Air distribution box 39 is preferably of a cylindrical shape with bores in its upper portion. A branch pipe of the air supply channel 38 is inserted through the side wall of slag discharge mechanism 5 and attached tangentially to air distribution box 39.

Slag discharge mechanism 5 is also equipped with table 41. Rotating slag scraper 42 is positioned on table 41. Rotating slag scraper 42 is constructed as a hollow structure with an air- or water-cooling system inside. Slag scraper 42 is equipped with coolant inlet branch pipe 45 and coolant outlet branch pipe 46. Slag scraper 42 is also equipped with bearing unit 4 and mechanical drive 43. Table 41 is attached to body 9 of slag discharge mechanism 5.

Flange 23 is a continuation of table 41. Air channels 48 are positioned between flanges 23 and 10, air channels 48 connect air cooling channel 11 with tray 24 of slag discharge mechanism 5. One or more slag collection bunkers 47 are attached to the lower surface of table 41. Slag collection bunkers 47 are connected to slag discharge lock channels 6.

Operation of the Preferred Embodiment

Feedstock is loaded into the receiving bunker of loading mechanism 33. Then, batches of feedstock are introduced into feedstock supply channel 34. Feedstock may be moved by a piston equipped with a drive. Thus, feedstock batches are introduced into a preferably inclined feedstock supply channel 34 and then into loading mechanism trunk 35. When a batch of feedstock is moved into loading mechanism trunk 35, piston 36 is located in its upper position. After a batch of feedstock is introduced into loading mechanism trunk 35, piston 36, driven by its drive, is brought down into its lower position, thereby moving feedstock down loading mechanism trunk 35. An airtight plug is formed from the feedstock under the pressure exerted by piston 36 and in conjunction with friction forces between the compressed feedstock and internal walls of loading mechanism trunk 35.

The operation of the drives and the pistons of feedstock supply channel 34 and loading mechanism trunk 35 is synchronized. That allows for batched supply of pressed feedstock in the form of a airtight movable plug into gasifier trunk 8. During the next loading cycle, a new plug that is formed in loading mechanism trunk 35 pushes the previous one down into gasifier trunk 8. Because the diameter of the gasifier trunk 8 is greater than the diameter of loading mechanism trunk 35, the feedstock, in the form of pressed airtight plugs, brakes down into smaller parts that are spread over the entire surface of the upper part of gasifier trunk 8.

Loading mechanism trunk 35 can be equipped with an external cooler protecting the airtight plug during the operation and especially during the shutoffs of the gasifier from drying up or burnout, which can result in the loss of the plug air-tightness. Gasifier trunk 8 is constructed as a truncated cone widened toward its bottom. The degassing slits, which are also widened toward the bottom, allow to reduce friction between feedstock (as it moves down gasifier trunk 8) and the internal walls of gasifier trunk 8, which, in turn, facilitates the passage of feedstock through gasifier trunk 8 into the fire chamber 5.

Compacted feedstock in gasifier trunk 8 along its entire length is exposed to the external heat from the walls of internal vessel 2, which is heated from the outside by hot gases produced in the zone of fire chamber 3 and channeled to gas outlet 13 through the gap between internal vessel 2 and external vessel 1. The temperature along gasifier trunk 8 reaches approximately 700° C. in its lower portion and approximately 300-400° C. in its upper portion.

Turbulator 27, which consists of a plurality of metal blades attached in a spiral pattern to the external surface of internal vessel 2, intensifies heat transfer from upward flow of hot gasification gases to the walls of internal vessel 2.

Figure 2:
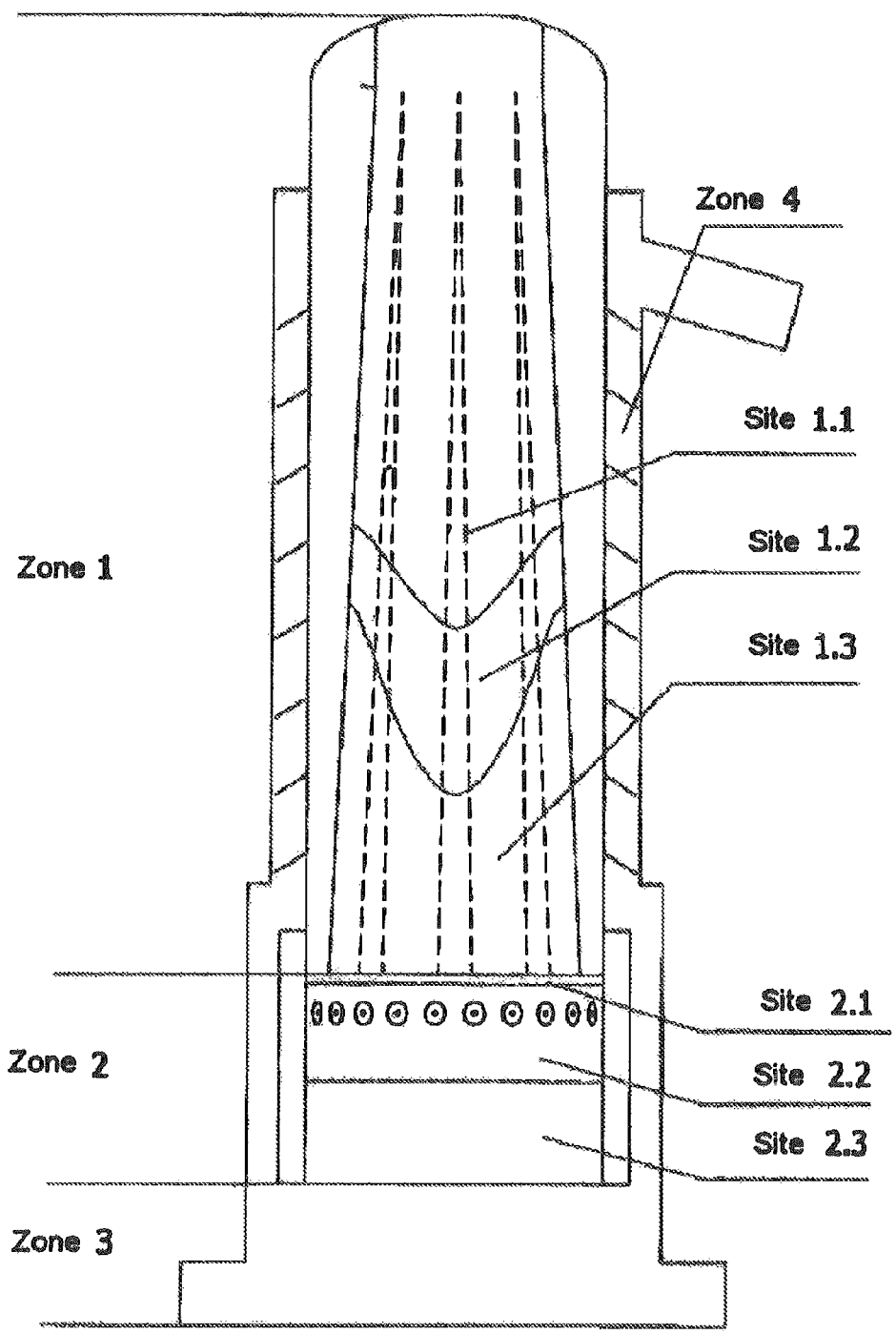
FIG. 2 is a symbolic depiction of the distribution of the functional zones in an apparatus that implements one embodiment of the method of the present invention.

Due to the continuing action of piston 36, feedstock inside gasifier trunk 8 moves down toward fire chamber 3. As it moves down gasifier trunk 8, feedstock undergoes changes caused by exposure to the heat. Such low-temperature processing of feedstock can be roughly divided into three stages: drying, plasticization and low-temperature pyrolysis. Thus, gasifier trunk 8 represents a zone of low-temperature processing—Zone 1. FIG. 2 schematically demonstrates various zones within the apparatus according to this invention:

Zone 1 can be, roughly, divided into three areas:
Area 1.1—feedstock drying zone;
Area 1.2—plasticization zone; and
Area 1.3—low temperature pyrolysis porolysis.

Process steam and pyrolysis gases that contain light tars and carbon are formed by low-temperature processing of feedstock in Zone 1. Such steam and gases enter into the damping chamber 37 through the degassing slits of gasifier trunk 8. Damping chamber 37 is positioned between gasifier trunk 8 and internal vessel 2. Process steam and pyrolysis gases then enter into the zone of the fire chamber 3 through the gap formed by the difference in the diameters of the lower portion of gasifier trunk 8 and internal vessel 2. A airtight plug, formed from feedstock in loading mechanism trunk 35, does not allow the discharge into atmosphere of the steam-gas mixture formed in Zone 1. The same plug prevents air from the outside from entering. Light tars and carbon together with pyrolysis gases, which are formed in the zone of the low-temperature pyrolysis (Area 1.3) and which pass through the degassing slits of gasifier trunk 8, could block the lower portion of damping chamber 37. However, the high temperature of approximately 1300° F. and steam that enters from the drying zone (Area 1.1), de-tar the lower portion of damping chamber 37, thereby allowing for unobstructed passage of the steam-gas mixture from damping chamber 37 into fire chamber 3.

There are no degassing slits in the plasticization zone (Area 1.2). That is necessary to ensure that the feedstock, which has changed its aggregate state from solid to viscous under the pressure of piston 36, is not pushed out at this area through the degassing slits into damping chamber 37, which could create obstacles for free passage of the steam-gas mixture.

Air supply channels 25 are positioned in damping chamber 37, on the opposite side of the degassing slits of gasifier trunk 8. Air, heated from the walls of slag discharge mechanism 5, is supplied from the air distribution shell 20 through air supply channels 25 to internal tuyeres 32 and is also supplied through the under-tuyere bend 30 to the external tuyeres 31.

Steam and/or carbon dioxide can be introduced into the gasifier as additional oxidizer through steam inlet 49 located in the upper portion of damping chamber 37.

Internal tuyeres 32 are positioned at the level of the lower edge of gasifier trunk 8. Internal tuyeres 32 are installed at an angle, approximately 45 degrees to the wall of internal vessel 2. The internal tuyeres are attached with plate holders, which also provide support for feedstock in gasifier trunk 8 to prevent abrupt falling of feedstock into the zone of fire chamber 3. The plate holders also help to separate feedstock into segments. That, in turn, facilitates the process of gasification of residual carbon in the zone of fire chamber 3 because it makes it possible for the air coming from external tuyeres 31 together with the gases coming from damping chamber 37 to freely penetrate into the pressed feedstock.

After passing through the zone of low-temperature processing (Zone 1), the steam-gas mixture and residual carbon, which is divided into segments and partially crushed, enter under action of piston 36 into fire chamber 3, wherein the zone of high-temperature processing (Zone 2) is located. Zone 2 is characterized by temperatures ranging from approximately 1300° F. to approximately 2400° F., where steam-gas mixture and residual carbon are subjected to high temperatures, as shown in FIG. 2:

Area 2.1—high-temperature pyrolysis and subsequent gasification zone;
Area 2.2—combustion zone;
Area 2.3—reforming zone.

Fire chamber 3 is positioned in the lower portion of internal vessel 2 and consists of a hollow under-tuyere bend 30, comprising the external wall 28 of fire chamber 3 and internal wall 29 of the fire chamber 3. Air supply channels 25 are attached in the upper part of internal wall 29. External tuyeres 31 are located in the middle portion of internal wall 29, along its entire perimeter.

Internal tuyeres 32 are positioned inside fire chamber 3. External tuyeres 31 and internal tuyeres 32 form the tuyere bends. Residual carbon and steam-gas mixture move from damping chamber 37 under the action of piston 36 along the tuyere bends. The air, heated from the walls of slag discharge mechanism 5, enters through air supply channels 25 into under-tuyere bend 30, where it is further heated while cooling the metal structure of under-tuyere bend 30.

The heated air enters the combustion zone (area 2.2) of fire chamber 3 through external tuyeres 31 at the rate of approximately 30 to 50 meters per second. The heated air is also supplied into the combustion zone through internal tuyeres 32, approximately at the same rate. Initially, under the influence of air oxygen in the combustion zone, there occurs practically complete combustion of high-energy gases and tars formed in the low-temperature processing (Zone 1) as well as partial combustion of residual carbon. Due to a significant exothermal effect of oxidative reactions in the combustion zone (Area 2.2), the temperature increases sharply up to approximately 2700-3100° F., which makes it possible to use feedstock with a high moisture content as well as to additionally increase the amount of produced gasification gases by means of hydro gasification products.

In turn, increasing moisture content of the feedstock allows to lower the temperature in this zone to 1600-2400° F. The high speed of air coming from the tuyeres greatly intensifies (up to 200%) the combustion of residual carbon directly in front of the tuyeres as compared to the overall combustion rate in fire chamber 3. That allows to loosen up the residual carbon bulk present in the zone of the tuyeres bend, to create in the same zone an intensive carbon boiling effect in the gases formed as a result of gasification, to intensify the effect of combustion reactions and primary reforming reactions in the that zone, which, in turn, significantly improves the composition of the produced gasification gases.

The residual carbon, which was not gasified in the combustion zone (Area 2.2), descends into the reforming zone (Area 2.3), where it participates in the secondary reforming reactions that result in a complete gasification. In this reforming zone (Area 2.3), the gases and tars of low-temperature processing, which did not react with air oxygen in the combustion zone (area 2.2), are finally converted and reduced to the level of simple combustible gases under the influence of high temperatures from hot residual carbon and slag. The reforming reactions, which take place in the reforming zone (Area 2.3), have highly pronounced endothermic character. That results in a decreased temperature in that zone as well as in a drop of temperature of the processed gasification gases to approximately 1300-1450° F.

The inorganic component of the residual carbon in the combustion zone (Area 2.2) and in the reforming zone (Area 2.3) acts as a sorbent and actively participates in the purification of the produced gasification gas from hazardous admixtures of heavy metals, sulfur and chlorine compounds, converting them into inactive insoluble in water form, i.e., mainly, a complex silicate slag.

The degree of gas purification as well as slag formation temperature in these zones depends directly upon the ingredients of the inorganic components in the residual carbon. Therefore, the degree of gas purification as well as the temperature of slag formation can be adjusted using inorganic additives in the feedstock, such as metal oxides, salts and oxide hydrates thereof, silicon dioxide and others.

The slag formed in the combustion zone (Area 2.2) is transferred through the reforming zone (Area 2.3) into the slag zone (Zone 3) in a liquid, viscous or solid state depending on the temperatures in these zones, morphological structure and moisture content of feedstock, as well as inorganic feedstock additives and possible additional supply of process steam into the gasifier. Slag is cooled, and mechanically crushed in the slag zone (Zone 3), with subsequent removal through slag discharge lock channels 6.

Flange 23 connects slag discharge mechanism 5 with the vessel of the gasifier through the lower flange 10 of the external vessel 1. Through air channels 48 are positioned between flanges 23 and 10, thereby connecting air cooling channel 11 and tray 24 of slag discharge mechanism 5. The system of air channels allows, with help of cold air supplied to the gasifier, reduce the temperatures that affect flanges 23 and 10, the body and other elements of slag discharge mechanism 5, as well as the lower part of external vessel 1, all of which are located in the high-temperature zone.

The air, heated in tray 24 of slag discharge mechanism 5, is supplied through vertical air channels 15 to air distribution box 20, positioned on cover 21, from which air is directed to the internal and external tuyeres of fire chamber 3. Body 9 of slag discharge mechanism 5 is attached to table 41 at the point of its transition to flange 23. Body 9 has bottom 40. Air distribution box 39 is located on internal part of bottom 40. Air distribution box 39 is preferably made in a shape of a cylinder with concentric bores in its cover.

Air supply channel 38 is introduced through the side wall of body 9 of slag discharge mechanism 5. Cool ambient air is supplied into the gasifier through air supply channel 38. Air supply channel 38 is preferably connected to air distribution box 39 at an angle to improve air distribution inside air distribution box 39. Rotating slag scraper 42 is positioned on table 41. Slag scraper is cooled from by the air flow air distribution box 39. Slag scraper 42 may be equipped with its own air or water cooling system, coolant inlet 45, coolant outlet 46, bearing block 44 and mechanical drive 43.

During rotational movements under the action of mechanical drive 43, slag scraper 42 scrapes off, with its toothed edge, a portion of solid slag above, whereas it also scrapes off, with its front sharpened edge, the slag from the surface of table 41, which slag enters in molten form, but subsequently solidifies on the surface of table 41 as a result of cooling by the air continuously supplied into tray 24. Slag is crushed and, under the action of a centrifugal rotation force of slag scraper 42, is thrown to the periphery of table 41, where one or more slag accumulation 47 bunkers are located. Slag accumulation bunkers are connected with slag discharge lock channels 6. Thus, slag accumulation bunkers 47 are filled with crushed slag. Subsequently, the upper slide gate of the lock device opens (not shown in FIG. 1) and the slag is discharged into the lock device, thereby emptying for slag accumulation bunker 47. Then, the upper slide gate closes and the lower slide gate opens (not shown on drawings), thereby emptying slag from the lock. The slag then is further directed by the transporter into the bunker of slag accumulation (not shown on drawings). This process allows to discharge the slag practically without any access of ambient air into the gasifier.

After passing the high-temperature processing zone, the gasification gases enter into the gas zone—Zone 4, which is located in the area between external vessel 1 and internal vessel 2. While ascending from the bottom upward through the void between internal vessel 2 and external vessel 1 from the lower portion of fire chamber 3 to gas outlet 13, the gas flow is cooled down to the temperature of approximately 300-400° C. due to the convective heat transfer in the zone of low-temperature processing (Zone 1) through internal vessel 2. To facilitate heat exchange, turbulator 27 is installed in the gas zone (Zone 4).

The gas flow, ascending from the bottom upward, enters into Turbulator 27, where it changes direction of its movement while moving in a spiral trajectory around internal vessel 2. Thereby, both the linear speed and the turbulence of the gas flow are increased. These two factors, together with the increased heat exchange surface (due to the surface of the blades of turbulator 27), significantly improve the heat transfer rate between the gases and internal vessel 2, thereby transferring the maximum amount of heat from the gasification gases to the feedstock in the low-temperature processing zone (Zone 1).

To avoid additional resistance to the flow of the gases coming out of the turbulator 27, gasification gas outlet 13 is preferably attached tangentially with a downward incline to external vessel 1, which, together with high velocity of the gas flow through gas outlet 13, minimizes the deposition on its lower wall of carbon and slag dust that may be present in the gasification gas.

Gas outlet 13 has external heat insulation and is connected through a flange joint with the hot cyclone separator that has a thermal isolation casing allowing to minimize heat losses of the gasification gas through the walls of the cyclone separator vessel. The hot cyclone separator is used to clean the gasification gases that exit from the gasifier from fine-dispersed carbon and slag dust, which is can be collected in the receiving bin and removed through a lock device.

Gasification gas can be further directed to a system for cooling and final purification, where cooling may be done with the production of process steam or hot water, whereas final purification from harmful admixtures may be necessary for its further industrial use.

For a better understanding of the instant invention but without limiting its scope, a description of the temperature zones is provided below.

Temperature Zones

Processes of heating, drying, low-temperature and high-temperature pyrolysis of feedstock take place simultaneously in the apparatus of the present invention. In addition, interaction of oxidizing gases with decomposition products and residual carbon of feedstock takes place in the apparatus.

Solid household waste (SHW), as feedstock for a gasifier apparatus, is an incredibly diverse and multicomponent composition of organic and mineral components. Table 1 contains data, upon which the following discussion is based.

Organic and mineral components of feedstock are essential for feedstock processing. They have a major effect on both the composition of the produced gasification gases and on the formation of residual slag. Both the composition and type of mineral components have an effect on the processing of feedstock. Two main types of inorganic components are distinguished: as mechanical admixtures and as components chemically bonded with feedstock content.

The first and key type comprises an amount of inorganic components that ranges between approximately 6% and approximately 25% of the total weight of feedstock. This type of components is found in feedstock as mechanical admixtures, such as nonferrous and ferrous metals, ceramics, construction waste, sweepings, glass and other, forming its mineral portion and comprising the following major components, such as: $CaCO_3$, $MgCO_3$, $FeCO_3$, $CaSO_4$, $Na_2SO_4$, $FeSO_4$, $FeS_2$, $SiO_2$, silicates with various content of main oxides $Al_2O_3$, $SiO_2$, CaO, $Na_2O$, $K_2O$ and small content of oxides of other metals.

These components can be symbolically arranged in accordance with decreasing of their content in feedstock, in the following order:

$SiO_2$—dozens of percents;

Al, $Al_2O_3$, MgO, Fe, $F_2O_3$, $CaSiO_3$, $CaCO_3$—percents, dozens of percents;

Cu, Zn, S, $TiO_2$, FeO, Ni, Pb, $Na_2SiO_3$, Sn, $CaSO_4$, $MgSO_4$, $Cl^-$, $S^{2-}$, $Na_2CO_3$—percents, tenths of a percent;

BaO, ZnO, Cd, NaCl, $NaPO_4$, $MgCO_3$, $MgSO_4$, $MgSiO_3$, $K_3PO_4$, $CaCl_2$, $MgCl_2$, $K_2CO_3$, Cr, Sb, SbO—tenths and hundredths of a percent;

NaOH, LiOH, W, $V_2O_5$, $Cr_2O_3$, $Ni_2O_3$, PbO, $ZnSiO_3$, $F^-$, $SO_3^{2"}$, Mn, V, Mo, As, Co, Hg, $As_2O_3$, BeO—less than one hundredth of a percent.

The second type of inorganic components comprises components chemically bonded with feedstock and constitutes a lesser amounts of compounds. This type of mineral components typically constitutes from 0.47% to 2.81% of the total weight of feedstock. Some of such components are, for example, metals and their oxides and salts, which are contained in paper, cardboard, wood, and dyes, contained in textile waste and polymer materials.

Zone 1—low-temperature processing zone, with temperatures ranging from: 20÷700° C.; this zone provides for drying, destruction and low-temperature pyrolysis of the feedstock introduced into the gasifier. This zone can be roughly divided by temperature ranges into 3 areas:

Area 1.1—drying zone. The temperature range is 20÷150° C.

Area 1.2—plasticization zone. The temperature range is 150÷350° C.

Area 1.3—zone of the low temperature pyrolysis. The temperature range is 350÷700° C.

Area 1.1—drying zone, with temperatures ranging from: 20÷150° C., located in the upper part of the loading channel, where the following processes take place:

In the cooled portion of the loading mechanism trunk: compacting of loaded feedstock and formation of an airtight plug, which is, essentially, a process of briquetting of feedstock;

In the zone warmed by the heat of the gasification gases in the upper portion of the gasifier trunk: initial warming of feedstock and evaporation of free moisture;

intensive steam formation; drying of feedstock, within which partial overheating of steam occurs; beginning of the process for change of aggregative state of fusible elements of feedstock, softening of local zones in the feedstock bulk.

In the context of drying processes, one distinguishes free moisture, moisture which is mixed with fuel (i.e., moisture, obtained in direct contact with water), and moisture, contained in the structure of feedstock (hygroscopic moisture), which is caused by vapor adsorption.

During the process of heating, the rate of drying quickly increases to a constant, and then the period of steady drying rate begins, and, after achieving of a hygroscopic state, the stage of a descending drying rate begins. The evaporation zone deepens into the bulk of pressed feedstock. At intensive heating of surface beds and enrichment of internal beds with moisture occur due to moisture evaporation from the surface and its movement into the bulk under exposure of hydrothermal conductivity.

During the drying process, the heat conduction coefficient constantly decreases. The heat-transfer coefficient, starting with a critical point, also dramatically decreases, as the moisture content decreases, which is caused by the deepening of the evaporation area and increasing of thermal resistance of dry outer bed of feedstock.

These processes lead to the deterioration of warming up of the internal beds of feedstock, which results in increasing times for complete drying of internal beds of feedstock. Accordingly, the lower limit of the drying area of the entire feedstock within the gasifier trunk takes a shape somewhat similar to a truncated cone, having its apex in the bottom, as shown in FIG. 2.

Steam, which is formed as a result of feedstock drying, enters the damping chamber through the degassing slits of the gasifier trunk, where, after making contact with the walls of the internal vessel of the gasifier, it becomes partially overheated.

During the entire drying process, the feedstock contracts; in other words, it decreases in volume, and its further warming up leads to greater structural changes.

Area 1.2—plasticization zone, with temperature change ranging from: 300÷675° F., is located in the middle warmed portion of the gasifier trunk, within which the following processes take place:
the complete drying of feedstock;
beginning of processes of decomposition and destruction of organic polymers;
change of aggregative state of fusible materials of organic and inorganic origin, their conversion into plastic or liquid state;
conversion of the entire feedstock into plastic movable mass; and
initial formation of tars and saturated and unsaturated hydrocarbons.

Thus, at the temperature of approximately 120 C, polyethylene starts to melt. As the temperature increases, other polymers, representing the fusible portion of the feedstock, start to melt. When the temperature reaches approximately 200-250° C., all polymers turn into a liquid substance, which fills in all voids in the feedstock bulk. At the same time, the entire feedstock turns into a plastic airtight substance that slowly moves down the internal space of the gasifier trunk under the pressure applied by the piston of the loading mechanism.

At the temperature of approximately 390° F., mineral colloids transition into a vapor phase. The resulting water vapors break through the viscous mass of the feedstock up into the drying zone, and then, together with water vapors formed in the drying zone, enter into the damping chamber.

In the process of structural changes, which take place in the drying zone, the entire feedstock contracts significantly and its thermal conductivity increases, thereby facilitating faster warming of the entire mass of feedstock, including its internal portions. However, the internal portion of feedstock still warms up slower than the external one. Therefore, the lower boundary of the plasticization zone and its upper boundary, take a shape of a cone of irregular shape with an apex at the bottom, as shown in FIG. 2.

At the temperature of approximately 480° F. such gases as carbon oxide and dioxide, as well as tar begin to discharge from the feedstock bed. Methane, heavy hydrocarbon gases and hydrogen begin to discharge as heating proceeds. Such gases break through the viscous bulk of feedstock into the zone of the low temperature pyrolysis. Then such gases flow into the damping chamber through the degassing slits of the gasifier trunk.

There are no degassing slits in the area of the gasifier trunk where the plasticization zone is located during the operation of the gasifier. This is done to avoid feedstock being squeezed out into the damping chamber. However, the steam formed in the upper portion of the plasticization zone enter into the damping chamber through the degassing slits of the drying zone, while the tars and gases from the lower portion of the plasticization zone enter into the damping chamber through the degassing slits in the low temperature pyrolysis zone.

Area 1.3—the low temperature pyrolysis zone, with temperatures ranging from approximately 350° C. to approximately 700° C., is located in the lower warmed portion of the gasifier trunk. The following processes take place in Area 1.3:
change of the aggregate state of refractory materials with the transition thereof into plastic state;
decomposition and destruction of organic compounds with the breakage of covalent bonds in polymers and lattices of organic compounds;
intensive gas discharge;
discharge of light tarous substances, solidifying of plastic material and carbonization thereof, starting with external layers;
transition of the entire bulk of feedstock into residual carbon; and
decomposition of certain organic salts.

The initial decomposition temperature of feedstock is determined mainly by feedstock's individual properties, although it somewhat depends on the heating conditions. The higher the content of bonded oxygen that is contained in the feedstock, the lower is its initial decomposition temperature.

At the initial heating stages of the feedstock, oxygen-containing components are discharged first from it, and the least oxidized tarous substances are discharged last. The availability of large amount of oxygen in the feedstock during its heating leads to an exothermal effect due to the oxidative reactions that take place. That leads to additional heating up of the feedstock, which, in turn, speeds up its destruction. Said process is further supported by decomposition of some inorganic salts, which results in formation of corresponding oxides, in some cases—oxygen and other salts, according to warming up of loaded feedstock:

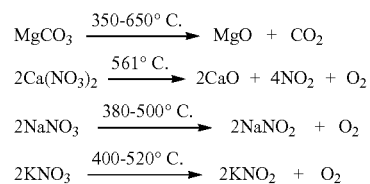

Oxidative reactions facilitate the increase of the temperature of feedstock in that zone that results in the discharge of various decomposition products, which depend from morphological structure of feedstock, mainly such as: steam, carbon dioxide, carbon oxide, acetic acid, methyl alcohol, formaldehyde, tar, methane, ethane, propylene and hydrogen and also some other decomposition products.

The availability of polymeric materials in the feedstock leads to the corresponding increase of ethylene and polypropylene yield. At the same time, polymers are decomposed practically completely without formation of residual carbon.

The aforementioned processes for destruction of feedstock and gas formation lead to significantly decreasing of feedstock amounts and transition of its structure into dense porous carbon form. As the heating process continues, discharge of tarous substances and other products, condensable at cooling, is practically completed. Although gas formation continues, it continues with a lesser intensity. Products of feedstock decomposition, formed as a results of the low temperature pyrolysis, enter the damping chamber through the degassing slits of the gasifier trunk. In the damping chamber, such products mix with steam from the drying zone and are subjected to further warming up under the action of thermal radiation from the wall of the internal vessel of the gasifier or from direct contact with it. Tars and particles of residual carbon being deposited on the walls of the damping chamber, are removed by high external temperatures and steam, which arrives from the drying zone above.

The draining of the liquid fraction to the center of the trunk and the conical shape of the lower boundary of the zone lying on the solid carbon residue reduce the possibility of the plastic mass of the feedstock extruding or of the draining of the liquid fraction through the degassing slits of the trunk into the damping chamber.

Zone 2—high-temperature processing zone, with temperatures ranging from approximately 700° C. to approximately 1300° C., which is characterized with high-temperature pyrolysis of feedstock and further gasification thereof under exposure of air oxygen and other oxidizers into gasification gas.

This zone is roughly divided by temperature ranges into 3 areas:
Area 2.1—high-temperature pyrolysis zone. The approximate temperature range is 700-900° C.
Area 2.2—combustion zone. The approximate temperature range is 900-1300° C.
Area 2.3—reforming zone. The approximate temperature range is 800-1100° C.

Area 2.1—high-temperature pyrolysis zone, with temperatures ranging from approximately 700° C. to approximately 900° C. The following processes take place in this zone:
final gas evolution process;
turning of residual feedstock into solid porous carbon bulk;
decomposition and melting of inorganic salts and interaction thereof with carbon and mineral components of feedstock.

The destruction of the fuel organic mass occurs along with formation of a small amount of methane, hydrogen as well astraces of other hydrocarbon gases.

The temperature of 900-1100° C. is the highest temperature at which the completion of volatile substances evolution from the solid residual carbon.

Certain carbonates are melted in this zone: $Na_2CO_3$—851° C., $K_2CO_3$—891° C., $Li_2CO_3$—618° C., and chemically interact with carbon and mineral components of feedstock:

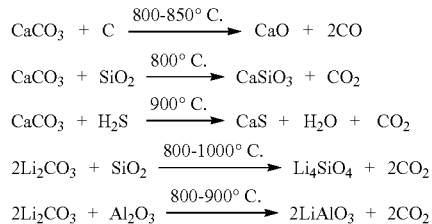

Notably, CO and $CO_2$ concentrations increase in the produced gases. In addition, certain chlorides are melted. For example: $CaCl_2$—787° C., NaCl—801° C. Molten chlorides and carbonates can form eutectic mixtures with more refractory salts, which results in a decrease of the melting temperature of the latter. This phenomenon has a significant effect on the subsequent formation of liquid slag with a decreased melting temperature.

Area 2.2—combustion zone, with temperatures ranging from approximately 900° C. to approximately 1300° C. The following processes take place in this zone:
combustion and heat destruction of the pyrolysis gases with low-temperature processing of feedstock;
combustion of portion of the residual carbon of feedstock;
crushing of the residual carbon bulk due to gas-dynamic processes, conversion of the residual carbon into "boiling" bed state;
separation of the residual carbon;
reforming of the combustion gases due to the oxidation of residual carbon;
oxidation processes and reforming reactions of the residual carbon component; and
beginning of the process of the residual slag formation.

The combustion area is the primary gasification zone, where decomposition and oxidation of gaseous pyrolysis products occur as well as intensive interaction of residual carbon, divided into segments and partially crushed under action of dividing plates positioned in the lower part of the gasifier trunk, together with air oxygen and other oxidizing gases. Initially only gaseous products are oxidized by the air oxygen, and to a lesser degree their interaction with carbon dioxide and steam, which is produced during the low-temperature processing of feedstock or supplied to the gasifier.

The limiting factor of gas combustion processes under a specific temperature is the diffusion rate, and for the residual carbon—the surface area of heterogeneous phase, the oxygen adsorption rate, and the reaction product desorption rate.

The combustion zone is symbolically identified in the gasification zone as Area 2.2, whose lower part contains the reforming zone—Area 2.3. Because gas formation processes in these zones are complex and interrelated, just like the processes of liquid slag formation, it is necessary to consider them together.

Gasification can be described with simple chemical reactions (1)-(11), which reflect the complex processes occurring in the combustion zone:

$$C+O_2=CO_2+95\ 407\ kCal/mol \qquad (1)$$

$$2C+O_2=2CO+55\ 514\ kCal/mol \qquad (2)$$

$$2CO+O_2=2CO_2+135\ 300\ kCal/mol \qquad (3)$$

$$CO+H_2O=CO_2+H_2+9849\ kCal/mol \qquad (4)$$

$$2CO+2H_2=CH_4+CO_2+59000\ kCal/mol \qquad (5)$$

$$CH_4+2O_2=CO_2+2H_2O+191\ 759\ kCal/mol \qquad (6)$$

$$C_2H_4+3O_2=2CO_2+2H_2O+316\ 195\ kCal/mol \qquad (7)$$

$$C_3H_6+4.5O_2=3CO_2+3H_2O+460\ 422\ kCal/mol \qquad (8)$$

$$C+H_2O=CO+H_2-30\ 044\ kCal/mol \qquad (9)$$

$$C+2H_2O=CO_2+H_2-20\ 195\ kCal/mol \qquad (10)$$

$$C+CO_2=2CO-39\ 893\ kCal/mol \qquad (11)$$

The combustion process takes place in the upper part of the fire chamber under exposure to the air oxygen, which is supplied through external and internal tuyeres that form tuyeres plates, within which the combustion zone is positioned.

For intensification of the gasification process, air is warmed up as a result of cooling of the elements of the gasifier. In addition, steam and/or carbon dioxide may be injected into the combustion zone at high velocities. Air injected through the tuyeres at a high velocity (up to 50 meters per second) through the tuyeres, intensifies the combustion process of the residual carbon of feedstock. That allows to raise temperatures at the initial stage of jet combustion in the portion of the fire chamber that is positioned in the area of the air tuyeres, up to approximately 1500° C., due to a high exothermal reaction effect (1)-(3), together with burning off of high-calorie gases and tars (6), (7), (8), formed in the zone of low-temperature processing of feedstock and in the area of high-temperature pyrolysis, depending on the amount of steam and carbon dioxide.

Air oxygen is practically completely consumed in the oxidation reactions of the pyrolysis gases and residual carbon with formation of, mainly, carbon dioxide and steam, which later plays the main role in the gasification process. Oxidative gases are also formed. Interacting with residual carbon, these gases are reduced mainly to simple combustible gases by reactions (9)-(11).

The increase of the temperature in the combustion zone allows to intensify hydrogasification reactions (9), (10), due to additional warming up of the residual carbon and steam, both of which are produced as a result of the oxidizing processes. The increasing temperature in the combustion zone causes an intensification of the hydrogasification reaction rates (9), (10) allows to use feedstock with an increased moisture content without a need for initial preliminary drying, or to additionally supply steam from the outside.

Similarly, with exposure to the initial high temperatures, a carbon dioxide gasification reaction of residual carbon occurs in the jet (11), which allows to use carbon dioxide supplied from outside as an additional oxidizer.

Reactions (9), (10), (11) take place mainly at the second stage of the jet combustion process in the combustion zone. These are primary endothermic reforming reactions. Due to these reaction, the total temperature in the lower part of the combustion zone is decreased to 900-1100° C. Then, the action of secondary reforming reactions (9), (10), (11) starts in the reforming zone of the gasifier, leading to the gasification of the residual carbon, unreacted in the combustion zone under exposure to the residual carbon dioxide and steam, which turns into combustible gasification gas.

The high rate of the hot air being injected through numerous tuyeres up to 50,000 kilogram per square meter per hour, intensifies the gasification of the feedstock in the area of the fire chamber located directly in front of the tuyeres. That, together with the increased of amount of heated air introduced into the combustion zone, allows:
- to cut, break into pieces and loosen the residual carbon, which comes to the combustion zone from the gasifier trunk as large sintered porous pieces;
- to improve the gas-dynamic properties in the combustion zone due to an intense boiling effect of the residual carbon in gas, which is a result of gasification, which in turn allows to avoid the formation of local stagnation areas in this zone;
- to separate the pieces of residual carbon, where larger and heavier portions of crushed bulk of the residual carbon descend into the gasification zone, and smaller portions are gasified in the combustion zone;
- to raise the temperature not only in the area where the tuyeres are located, but also in the entire combustion zone, which allows to maximally intensify the gasification process and to increase the degree of tar, acids and complex hydrocarbon conversion in this zone;
- to double or triple the total intensity of gasification of the feedstock, e.g., increasing the throughput from 500 to 1500 kilograms per square meter per hour across the entire cross-section of the fire chamber; —to produce gases with improved composition due to their saturation with simple combustible gases as CO and $H_2$, which leads to a higher level of the hydrogasification reaction (9), (10) and carbon dioxide gasification (11) passing; and
- to decrease the ballast content in the total volume of the produced gas, where the ballast is in the form of $CO_2$, $H_2O$, $O_2$, and $N_2$, as a product of air gasification, which in turn allows to more efficiently use the produced gasification gases for electricity production and other purposes.

The mineral portion of residual carbon is also cardinally changed, both chemically and structurally, in the gasification zone.

Due to high temperatures, the process of decomposition of salts of the mineral portion of the residual carbon that started in the low temperature pyrolysis zone is significantly intensified in the combustion zone. Because of the action of the supplied oxygen, complete or partial oxidation of some metals is possible in the portion of the fire chamber that is located in front of the tuyeres:

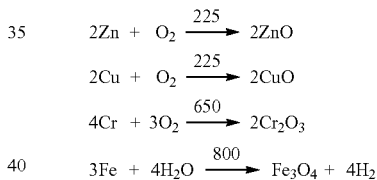

Nitrogen N and sulfur S are oxidized to oxides $SO_2$ and $NO_x$ in the same zone. Their amounts depend on the starting content of said elements in the loaded feedstock and the amount of free air oxygen in the fire chamber.

In the combustion zone, formation reactions of $NH_3$, $H_2S$, and HCl and other gases, which are harmful gas components subject to removal from the produced gas, take place.

Subsequently, at the second stage of combustion, in the process of primary reforming reactions, when oxygen is completely consumed for oxidation, a portion of oxides is reduced to metals and non-metals under action of the burning hot carbon:

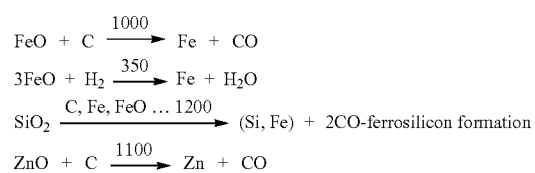

Notably, $SO_2$ and NO are reduced to simple elements S and $N_2$, which are further bonded with oxides and metals with the formation of corresponding sulfides and nitrides.

Also, the reaction of sulfur dioxide—$SO_2$ takes place with the formation of hydrogen sulfide—$H_2S$, which later forms corresponding sulfides by interaction with metal oxides.

$$CaO + H_2S = CaS + H_2O$$

$$FeO + H_2S \xrightarrow{500} FeS + H_2O$$

$$ZnO + H_2S \xrightarrow{500} ZnS + H_2O$$

Similarly halogens are bonded with the formation of chlorides and fluorides of various metals.

$$CaO + 2HCl = CaCl_2 + H_2O$$

$NH_3$ can also react with certain oxides and pure metals oxidizing to nitrogen or with the formation of nitrides:

$$2NH_3 + 3Mg = Mg_3N_2 + 3H_2$$

$$2NH_3 + 2Al = 2AlN + 3H_2$$

$$2NH_3 + 3CuO = N_2 + 3Cu + 3H_2O$$

In the presence of some unreacted steam in the gasification zone, the downdraft process, i.e., —salt hydrolysis, is also possible, but it is minimized due to the activation of the hydrogasification process and the presence of large amounts of free moisture in this zone.

The entire process continues in the reforming zone in Area 2.3.

Area 2.3 reforming zone with temperatures ranging from approximately 800° C. to approximately 1100° C. This zone is characterized with:
the process of secondary reforming reactions;
purification of produced gases from hazardous components;
completion of the process of liquid slag formation;
processes of final formation of the produced gasification gas composition.

As a result of processes which take place in the combustion and reforming zones, oxides of various metals containing carbon admixtures and small amount of not decomposed salts as well as reduced pure metals of minerals portion of feedstock are formed. Depending on the starting composition of the feedstock, some amount of metal alloys may be formed, based on iron, copper and silicon.

Exposed to high temperatures, portions of metals as oxides as well as pure metals and salts thereof can turn into a gaseous state. However, most volatile metals and compounds thereof remain in a solid or liquid state. That can be explained either by an insufficient time they are present in the high-temperature zone or by the formation of other less volatile compounds, e.g., certain sulfides, silicates and chlorides.

Sulfides, silicates as well as various chlorides formed as a result of said reactions actively participate in the formation of liquid residual slag.

The basic material for the formation of any silicate slag is silicon dioxide $SiO_2$. If there is a lack of it in the mineral component of the feedstock, it needs to be added during the feedstock preparation.

While passing through the bed of slag being formed, gases produced in the combustion and reforming zones, are partially purified from the hazardous gas components, mineral dust evacuated with them, solid metal particles, and a portion of gaseous metals. Consequently, gases with small amounts of mechanical admixtures, such as mineral dust, various heavy metals and other harmful components, enter the fire chamber.

In addition, due to the endothermic effect of reforming reactions, gasification gas at the outlet of the fire chamber has the temperature approximately in the range of 700-800° C.

Possible distribution ratios of heavy metals in the slag, in the dust carried in the produced gas and in the produced gas at the completion of the gasifier process are shown the Table 1:

TABLE 1

| Metal | Content in gas, % | Content in evacuated dust, % | Content in slag, % |
| --- | --- | --- | --- |
| Fe | 0.02 | 0.49 | 99.49 |
| Cr | 0.5 | 4 | 95.5 |
| Cu | 1 | 5 | 94 |
| Sn | 4 | 9 | 87 |
| Zn | 4 | 22 | 74 |
| Pb | 5 | 18 | 77 |
| Sb | 5 | 17 | 78 |
| Bi | 6 | 19 | 75 |
| Cd | 12 | 38 | 50 |
| Hg | 72 | 12 | 16 |

However, the ratios provided in Table 1 depend on the metal activity level, their concentration in the residual carbon as well as the presence of mineral additives in the feedstock in the form of, e.g., limestone, dolomite and/or base iron ores.

Typically, solid household waste contains significant amount of mineral component. Their concentration increases as the feedstock enters the combustion zone. That is explained by the gradually decreasing volume of the feedstock due to the removal of moisture, gaseous products and tars from it in the low-temperature processing zone. Therefore, the amount of mineral additives may be reduced or they may not be necessary at all.

It is important that the feedstock contain flux additives for liquid slag. Produced slag should be sufficiently movable and fusible to ensure an uninterrupted operation of the gasifier. The formed slag needs to be able to flow down the channels, which are formed in the residual carbon bulk, into the slag zone, where the slag is cooled with the subsequent mechanical crushing and removal. Slag that is too thick and/or viscous can make the combustion and gasification zones less penetrable and, as a result, can slow down or completely stop the gasification process. It also can substantially complicate its removal from the gasifier.

To facilitate slag passage and removal, special additives, such as fluxes can be used. In case of use of solid household waste as the feedstock, these additives may be minimal or not necessary at all. That is because, mineral components of the feedstock take part, both chemically bonded with organic components (second group) and as mechanic admixtures (first group), in the process of residual slag formation.

Small mechanical inclusion of the first group, evenly distributed in the organic portion of the feedstock, after the pyrolysis zones, are slightly protected by carbon from exposure to high temperatures, and, thus, they are the main source of slag formation.

Large mechanical inorganic inclusions of the first group after pyrolysis zones are also slightly shielded by carbon from exposure to high temperatures. However, in spite of that, due to their large size and weight, they quickly pass the combustion zone, and enter the lower part of the reforming zone. They are cemented with more fusible fine mechanical inclusions, or melted slowly, capturing ash and slag particles.

In the pyrolysis process, after the removal of volatile components, inorganic compounds of the second group remain in the structure of the residual carbon, and their melting under due to high temperatures takes place only after carbon removal because carbon shields inorganic components, hindering their heating and further melting. These mineral inclusions are not the reason of the base slag formation process, and, usually, they remain in solid form.

The increase of the temperatures in the combustion and reforming zones as well as the availability of large amounts of mineral low-melting components formed as a result of reforming reactions, allows the formation of eutectic alloys with low melting temperatures and refractory components. The resulting slag is a free-running ashy mass with solid inclusions of carbon, refractory alloys and particles of inorganic nature, which did to turn into liquid state, and large particles, which did not melt or react chemically.

In the event of accumulation of solid slag in the reforming zone, formation of which may be related to an excessive moisture content in the feedstock, large amounts of refractory mineral components in the feedstock or insufficient addition of fluxes, complete or partial clogging of this zone with solid slag is possible.

If that happens, residual carbon exerts pressure upon the slag bulk, where residual carbon is supplied from the gasifier trunk into the fire chamber under the action of the loading mechanism. That results in an extrusion of slag from the fire chamber zone into the space of the slag zone, where the slag is cooled, crushed and removed from the gasifier.

Zone 3—Temperatures range in this zone from approximately 300° C. to approximately 800° C., and the following processes take place:

slag cooling;
mechanical slag crushing;
slag removal.

Slag is formed as a result of feedstock processing in the combustion and reforming zones. Slag main components are metal and non-metal oxides: $SiO_2$, $Al_2O_3$, $Fe_2O_3$, FeO, CaO, MgO, $Na_2O$, $K_2O$, as well as sulfides, chlorides, fluorides, inclusions of metal alloys and unreacted carbon. Thus, slag is a complex amorphous and crystal form of silicates of variable structures with some amount of mechanical inclusions.

Slag enters the slag discharge zone as a liquid, in the form of individual solid masses, or, more rarely, in the form of slag bulks. There, it slowly cools down under an indirect action of cold ambient air that enters into the gasifier. When slag comes to the metal plate table, it cools down from the bottom by the air flow. The liquid fraction of the slag solidifies quickly, after which it is cut off by the rotating slag scraper.

Rotated by the mechanical drive, the upper notched edge of the slag scraper cuts off portions of the solid slag. Slag is crushed, broken down and removed from the peripheral areas of the table, where one or several lock channels are positioned. Then, slag is removed to the transporter through the slag channels for being discharged from the gasifier. Lock channels allow to perform slag discharge, while effectively preventing ambient air from entering into the gasifier.

Zone 4—gas zone with the temperatures ranging from approximately 300° C. to approximately 800° C. In this zone, gas is cooled down from 700÷800° C. to 300÷400° C.

After the reforming zone, the produced gasification gas enters into the gas zone positioned in the space between the external and internal vessels of the gasifier. Passing from the bottom upwards through the space between the external and internal vessels of the gasifier, the gas flow cools down to the approximately 300÷400° C. due to the heat emission in the zone of low-temperature processing. During that phase, gas "tempering" takes place, which, in the context of the present application, means the finalization of the gas composition.

To speed up heat exchange, a turbulator is installed in the gas zone. The turbulator is a multi-passage tunnel device with spiral channel positioning. Gas flows passing upwards from the bottom enter into the tunnel device, where it changes its direction while moving in a spiral trajectory around the internal vessel of the gasifier. The gas flow increases at a linear rate and becomes turbulent, which improves heat exchange to allow for maximum heat transfer from the gasification gases to the feedstock in the low-temperature processing zone. Although tar is contained in the gas in amount of 0.3÷0.5 g/nm$^3$, no tar is deposited on the walls or on the blades of the turbulator because tar's condensation temperature is less than 300° C.

Gas flow then passes through the gas outlet into the hot cyclone separator, where it is cleaned from fine carbon and slag dust, which is typically contained in the gas in the amounted of approximately 3÷10 g/nm$^3$. Then, the so removed fine carbon and slag dust is removed from the apparatus through the receiving bunker lock and moved to the transporter for discharge from the gasifier.

Gasification gas is then directed to the cooling and final purification system, where its cooling and purification from the remaining residues of hazardous inclusions take place, which is typically necessary to make the gasification gas suitable for power generation or other purposes.

Unless defined, technical and scientific terms used in this specification have meanings that should be readily understood by a person skilled in the art.

Without limiting the above description and possible modifications that would be apparent to a person skilled in the art, the following are some of the advantages that may be associated with the methods and apparatus described herein:

The high-velocity hot air introduced through the system of external and internal tuyeres and caused by it intensification of the gas formation reactions allows to increase the throughput to approximately 1,000-1,500 kg/m$^2$/hour across the entire area of the fire chamber. Actual throughput depends, among other factors, from the morphological structure and moisture content of the feedstock.

The produced gasification gases have relatively low temperatures (approximately in the range of 300-400° C.), contain practically no acids, the amount of tars is within the range of 0.3-0.5 g/nm$^3$, and amount of fine dispersed carbon and slag dust is within the range of 3-10 g/nm$^3$.

There content of heavy metal oxides in the produced gases is relatively low because heavy metals along with other hazardous components transfer into inactive and insoluble in water silicate form and then they are removed from the gasifier with slag.

Content of the hazardous gas components, such as $NO_2$, $NH_3$, $SO_2$, $H_2S$, and HCl, is minimized. At the same time, complex saturated and unsaturated gaseous hydrocarbons, including dioxins and furans, are practically not present in the produced gases.

After being cooled and cleaned, the produced gasification gases mainly consist of CO, Hz, $CH_4$, $CO_2$ and $N_2$, where the $CO_2$ portion is practically reduced to zero, and the $N_2$ content is minimized to the levels of industrial use of such gas in standard gas-diesel, gas powered and gas-turbine electro-generating apparatuses, efficiency coefficient of which is twice higher than that of steam apparatuses, which are used in modern pyrolysis and gasification technologies based on updraft gasification processes.

Without limiting the generality of this invention, the following benefits may be derived through the implementation of an apparatus according to the present invention:
ability to use solid household and industrial waste and other types of carbon-containing feedstock;
reduced requirements for and expense of feedstock preparation;
no need to perform preliminary drying of the feedstock;
the entire feedstock processing (pyrolysis and gasification) can be performed in the same apparatus;
changing of feedstock and discharge of slag are performed automatically;
it is possible to supply an oxygen-steam mix into the apparatus along with hot air or air-steam mixture, which allows to produce gases of various quality for various applications; and
cooling and purification/cleaning systems use simplified technologies because of the low level of pollutants found in the produced gases, thereby reducing the operation costs and reforming of prices of equipment.

The following examples are provided only to illustrate the present invention and should not be construed as limiting its scope.

Example 1

Technological Scheme of an Apparatus for Bed Gasification Under Pressure

Prior to entering into the gasifier, the feedstock (e.g., solid household waste) is prepared where excessive amounts of inorganic components, especially large fractions are extracted from the feedstock, and then the feedstock is crushed and broken down. Special additive can be added by means of batchers, depending on the morphological structure of the feedstock, as limestone, dolomite, base iron ores and also products of finished chemical purification of the gasification gas, such as, for example, $Na_2S$, NaCl, NaOH, FeO, $Fe_2O_3$ and others. Then, the feedstock passes on the transporter into the bunker of the loading mechanism and, is transported into the apparatus of processing.

Gasification gases produced as a result of the processing of feedstock with the temperature at the exit from the apparatus in the range of approximately 300÷400° C., pass through the heat-insulated outlet to the hot cyclone separator, equipped with thermal isolation casing. In that separator, gasification gases are preliminary cleaned from the mechanical admixtures such as slag and some amount of carbon dust.

The slug formed in the gasifier as a result of processing of feedstock with the temperatures of approximately 200° C., are supplied to the transport discharge apparatus through the lock channels and are directed into the storage bunker, where they are further cooled. The slug dust from the hot separator is removed through the storage bunker and lock discharge channel to the transport discharge apparatus, where it is mixed with the slag from the gasifier and further transported into the storage bunker.

After the preliminary purification from mechanical admixtures in the separator, the gasification gases are directed to the first heat exchanger, cooled by cold water, where the gases are cooled to approximately 40° C. At the same time, cold water, that passes through the water treating system, is heated to the temperature of about 60÷80° C. and directed to the second heat exchanger.

The first heat exchanger is equipped with the condensate receiver, where water condensed steam, residual tars unreacted in the gasifier, fine dispersed slag and carbon dust are accumulated together with other gas components. All condensed liquid, viscous and solid components together with condensed water are directed from the condensate receiver through a batcher into the feedstock which are supplied into the gasifier, or pass through the filter, where excess water is removed from it and directed to the water purification system. Partially dehydrated residue is directed into the feedstock.

After the first heat exchanger, the partially purified and cooled to the temperature of 40° C. gasification gases are supplied into the fine filter, where gases are further purified. Wooden chips and/or sawdust may be used as filtering elements for more thorough cleaning of the gases. After being used in the filter, such filtering elements may be added to the feedstock. Cleaned and purified gasification gases are directed to the chemical purification filter, where they are purified from the residues of hazardous gaseous components, such as HCl, $H_2S$, $SO_2$ and others.

The filtering element of the filter may represent a porous solid structure, consisting of iron oxides $Fe_2O_3$ and FeO that purify gases passing through them. Sulfur-containing and chlorine-containing components of are bonded on the surfaces of the filtering elements. Cleaning and regeneration of the filtering elements are performed by cyclic passing of NaOH solution through it. The alkali solution contains sodium sulfides and chlorides $Na_2S$, NaCl, as well as some dissolved iron oxides as complex compounds of various composition, such as $Na[Fe(OH)_4]$, $Na_4FeO_3$ etc.

Upon achieving of the necessary concentration of these substances in the NaOH aqueous solution, the solution is replaced to the new one. The used solution together with particles of filtering element dissolved in it, such as $Fe_2O_3$ and other compounds, is directed through a batcher into the feedstock and used as an additive. After the chemical purification filter, the gasification gas is directed into the gasholder where its composition is averaged. Then, gasification gas can be used in gas-diesel, gas powered or gas-turbine aggregates for power generation.

Hot flu gases with the temperatures of approximately 900÷950° C. produced as a result of combustion of gasification gases, are supplied into the second heat exchanger, where they are cooled down to approximately 200÷250° C. At the same time, the water used for cooling is heated to about 60÷80° C. in the first heat exchanger. Depending on the need and construction of the second heat exchanger, it is possible to obtain process steam of various parameters and hot water at the exit for the heat exchanger. The steam portion can be directed to the gasifier through a separate channel as an additional oxidizer.

Figure 3:
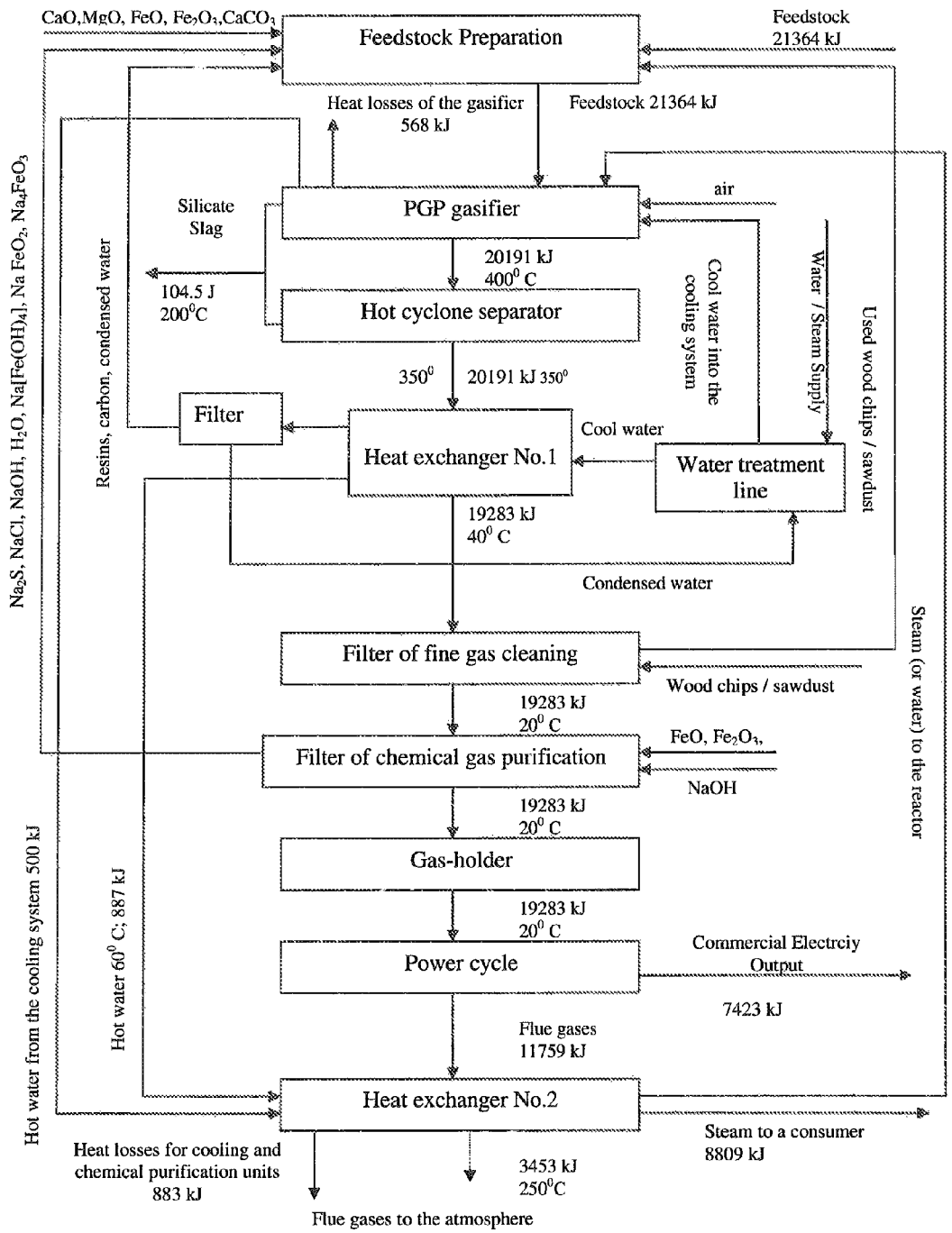
FIG. 3 is a flowchart of one embodiment of the method of the present invention.

Variations and modifications and alterations of the above example can be derived from FIG. 3, where the technological scheme of the under-pressure-bed gasification process is depicted.

Example 2

Comparative Characteristics of Main Utilization Techniques of Solid Household Waste For proof of efficiency of the under-pressure-bed gasification process in relation to the prior art technologies, calculations have been performed using simplified approximated models. Thus, the results cannot be considered to be precise reflections of the actual processes. The main goal of the calculations was to obtain data, based on which one could perform a comparative analysis of the efficiency of the technological schemes of solid household waste utilization.

The algorithm set forth below is a sequence of steps for modeling of the technology of bed gasification under pressure. For calculation of all other technologies, the same principles may be used, taking into account the differences between process technological schemes. The initial conditions for all technologies are the same—it is the composition of the feedstock, its drying and sorting (for all technologies the feedstock with 10% moisture content and 10% inorganic component is loaded).

1. Feedstock supplied into the gasifier.

1.1. The calculation is based on the average morphological structure of the solid household waste, as presented in the Table below:

| Solid Household Waste Components | Content, % |
|---|---|
| News print paper | 2.89 |
| Other paper | 23.19 |
| Food waste | 9.02 |
| House waste | 3.94 |
| Plastic | 16.84 |
| Textile | 6.5 |
| Wood | 4.94 |
| Gum, leather | 12.68 |
| Glass | 0 |
| Metals | 0 |
| Other inorganics or all inorganics | 20 |
| Construction waste | 0 |
| Total | 100 |

1.2. The reference data about element composition of each morphological group are assumed as follows:

| Elements | News print paper | Other paper | Food waste | House waste | Plastic | Textile | Wood | Gum, leather | Glass | metals | other inorganics | building waste |
|---|---|---|---|---|---|---|---|---|---|---|---|---|
| C | 0.366 | 0.324 | 0.179 | 0.232 | 0.564 | 0.372 | 0.412 | 0.43 | | | | |
| H | 0.047 | 0.045 | 0.025 | 0.03 | 0.078 | 0.050 | 0.050 | 0.054 | | | | |
| O | 0.300 | 0.299 | 0.129 | 0.175 | 0.08 | 0.271 | 0.346 | 0.116 | | | | |
| N | 0.001 | 0.003 | 0.011 | 0.009 | 0.009 | 0.031 | 0.002 | 0.013 | | | | |
| Cl | 0.001 | 0.006 | 0.004 | 0.001 | 0.03 | 0.003 | 0.001 | 0.05 | | | | |
| S | 0.019 | 0.002 | 0.001 | 0.002 | 0.003 | 0.003 | 0.001 | 0.012 | | | | |
| Moisture Content | 0.25 | 0.23 | 0.6 | 0.45 | 0.15 | 0.25 | 0.16 | 0.1 | | | | |
| Ash level | 0.016 | 0.091 | 0.051 | 0.101 | 0.086 | 0.02 | 0.028 | 0.225 | 1 | 1 | 1 | 1 |
| Total | 1 | 1 | 1 | 1 | 1 | 1 | 1 | 1 | 1 | 1 | 1 | 1 |

1.3. Based on the data about the morphological structure and element composition of each morphological group, the element composition of the entire solid household waste is calculated. In subsequent calculation, for simplification, one should not take into account the chlorine content in the feedstock:

| Elements | Content, % | Content %, without chlorine |
|---|---|---|
| C | 30.531 | 30.946 |
| H | 4.094 | 4.149 |
| O | 15.946 | 16.163 |
| N | 0.739 | 0.749 |
| Cl | 1.341 | |
| S | 0.329 | 0.334 |
| Moisture content | 19.451 | 19.715 |
| Inorganic component | 27.569 | 27.94 |
| Sum | 100 | 100 |
| Organic portion | 52.981 | 52.341 |

1.4. The calculation of feedstock composition is performed after is sorting and drying. For all comparative calculations, an assumption is made that after sorting the residual inorganics comprise 10%, and moisture content is 10% after drying:

| | Initial | | After Partial Removal of Moisture and Inorganics | | |
|---|---|---|---|---|---|
| | % | weight | % | weight in the feedstock | weight of removed moisture and inorganics |
| Organics | 52.34 | 800 | 80 | 800 | |
| Inorganics | 27.94 | 427.054 | 10 | 100 | 327.054 |
| Moisture Content | 19.72 | 301.414 | 10 | 100 | 201.414 |
| Total | 100 | 1528.468 | | 1000.000 | 528.468 |

2. Based on the calculated element of the solid household waste, composition the coefficients for the formula of the loaded feedstock are determined:

| Gross-Formula of the Feedstock | |
|---|---|
| Elements | Element Coefficients in the Gross-Formula |
| C | 1 |
| H | 1.609 |
| O | 0.392 |
| N | 0.021 |
| S | 0.004 |
| $H_2O$ | 0.125 |

3. All further calculations are performed per 1,000 g of sorted and dried feedstock, i.e. in this case, per 1,000 g of solid household waste with 10% moisture content and 10% of inorganic components.

4. The quantitative fuel characteristics are calculated based on the obtained gross-formula—element weight in fuel, molecular weight, substance amount, and combustion heat:

| Residue Composition (dry) | | |
|---|---|---|
| Component | % | Weight, g |
| C | 47.29 | 472.992 |
| H | 6.34 | 63.416 |
| O | 24.7 | 247.04 |
| N | 1.14 | 11.448 |
| S | 0.51 | 5.104 |
| Inorganics | 10 | 100 |
| Moisture Content. | 10 | 100 |
| Fuel Substance Amount, mol | | 39.9087 |
| Fuel Molecular Weight, g/mol | | 22.55147374 |

5. Calculation of calorific value of the feedstock.

5.1. Calculation of the fire chamber composition without inorganic component and moisture content:

| | |
|---|---|
| C | 59.124 |
| H | 7.927 |
| O | 30.88 |
| N | 1.431 |
| S | 0.638 |
| Total | 100 |
| Moisture Content. | 10 |
| Inorganics | 10 |

5.2. Based on the Mendeleyev formula (339C %+1256H %−109.8(O %−S %)=Q) and element composition, the fuel calorific value is calculated. The calculations for the fuel organic component, for sorted fuel, and for unsorted fuel are performed in kJ/kg and also in kJ/mol for sorted fuel (the latter is required for further calculation of reaction thermal effects):

| | | Moisture Content. | Inorganics | Weight of Feedstock |
|---|---|---|---|---|
| fuel combustion heat −1, kJ/kg | 26705.99 | 0 | 0 | 800.000 |
| fuel combustion heat −2, kJ/kg | 21364.79 | 10 | 10 | 1,000.000 |
| fuel combustion heat −3, kJ/kg | 13977.92 | 19.72 | 27.94 | 1,528.47 |
| fuel combustion heat, kJ/mol | 602.26 | 0 | 0 | 800.000 |

5.3. For further calculation of the thermal effects, the reference data of combustion heat of the base gases (CO, $CH_4$, $H_2$) and carbon (C) are used:

| Combustion Heats | kJ/mol |
|---|---|
| C | 406.8 |
| CO | 284 |
| $CO_2$ | 0 |
| $CH_4$ | 808 |
| $N_2$ | 0 |
| $H_2$ | 239.9 |
| $H_2O$ | 0 |

6. An assumption is made in the calculation that the processes of pyrolysis of loaded feedstock and subsequent oxygen gasification (oxidation), hydrogasification and carbon-dioxide gasification of carbon formed during the pyrolysis occur in the reactor in series.

7. The pyrolysis process is considered as a model reaction:

$$CHONS = C + CO + CH_4 + H_2O + H_2S + N_2 + H_2$$

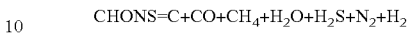

Coefficients for this equation can vary, depending on the composition of the utilized feedstock. For calculation of the pyrolysis process, the following conditional assumptions are also used:

$CO_2$ in pyrolysis stage does not form or is completely consumed in other reactions;

NO, $NO_2$ and other nitrogen oxide do not form or are consumed in other reactions;

Sulfur forms hydrogen sulfide only; however, under the real conditions, about 50% of sulfur remains in the residual slag as sulfides, and a portion of sulfur can pass from the reactor as sulfur oxides.

7.2. The ratio of the formed CO and $H_2O$ cannot be determined precisely based on the feedstock composition. These data can be obtained only in a practical way. Thus, such values are set initially in the calculation conditions, as a percent ratio of oxygen turning from the feedstock into CO and $H_2O$.

7.3. Similarly, one cannot precisely set the ratio of $CH_4$ and $H_2$. To determine such parameters, a percent ratio of hydrogen is set, where hydrogen transfers from the initial feedstock into the products, such as $CH_4$, $H_2O$, $H_2S$, and $H_2$.

| Oxygen Distribution During Pyrolysis Process | |
|---|---|
| oxygen in $H_2O$, % | 10 |
| oxygen in CO, % | 90 |
| Hydrogen Distribution During Pyrolysis Process | |
| hydrogen in $CH_4$, % | 30 |
| hydrogen in $H_2O$, % | 4.87 |
| hydrogen in $H_2S$, % | 0.50 |
| hydrogen in $H_2$, % | 64.63 |

7.4. Based on the element weight in the feedstock and the set conditions on distribution of hydrogen, carbon and oxygen, coefficients in pyrolysis reaction equation are calculated:

| Coefficients in the Pyrolysis Equation | |
|---|---|
| Substance | Coefficient in the Equation |
| C | 0.527 |
| $H_2$ | 0.520 |
| $H_2O$ | 0.0392 |
| CO | 0.353 |
| $H_2S$ | 0.00404658 |
| $N_2$ | 0.010372873 |
| $CH_4$ | 0.120666734 |
| sum | |

7.5. Based on the calculated reaction coefficients, the calculation of gas and carbon weight and of the amount obtained during the pyrolysis process:

| Substance | Gas Amount, l | Weight, g (taking into account loss of C in slag) |
|---|---|---|
| C | | 249.17 |
| H$_2$ | 459.02 | 40.98 |
| H$_2$O | 34.58 | 27.79 |
| CO | 311.27 | 389.09 |
| H$_2$S | 3.57 | 5.42 |
| N$_2$ | 9.16 | 11.45 |
| CH$_4$ | 106.54 | 76.1 |
| Sum | 924.14 | 800 |

8. Oxidation with oxygen.

8.1. A certain amount of air is supplied into the reactor. This calculation determines an amount of air necessary to be supplied into the gasifier to remove heat energy in the process of combustion of feedstock portion, which is required for maintaining heat balance of the gasifier.

8.2. To simplify the calculations, an assumption is made that only carbon reacts with oxygen. In the real process, initially, the combustible gases, which are formed during the pyrolysis process, are burned, and the carbon portion is burned in parallel with them. It is also assumed that the combustion process is completed and no products of incomplete combustion are formed:

$$C+O_2=CO_2$$

8.3. The excess of added air may or may not be used in the calculation.

There is no excess air in the case reflected in the table below:

| Reagent Supply | |
|---|---|
| Oxygen Excess, volume parts | 1 |

8.4. An optional value of weight and amount of spent oxygen, to which air nitrogen is added correspondingly, is initially introduced into the calculation:

| Gas | Weight, g | Volume, l |
|---|---|---|
| O$_2$ added ((taking into account the excess, if any) | 280.54 | 196.38 |
| O$_2$ theoretically required | 280.54 | 196.38 |
| nitrogen from air | | 738.76 |
| added air (taking into account the excess, if any) | | 935.15 |
| air, theoretically required | | 935.15 |

8.5. Weight and amount of the formed gasification products at the combustion of the feedstock portion (carbon in this case) and the weight of carbon consumed at that are determined.

8.6. Based on the thermal effect of the carbon combustion reaction, the total amount of thermal energy is determined, which is evolved at interaction of all required air oxygen:

| Reaction thermal energy C + O$_2$ = CO$_2$, kJ/mol | 406.8 |
|---|---|
| Reaction thermal energy C + O$_2$ = CO$_2$, kJ/mol | 3566.41 |

9. CO$_2$ conversion—carbon dioxide gasification.

9.1. A portion of formed CO$_2$ interacts with various solid or gaseous components. For calculation convenience, the CO$_2$ conversion is considered in accordance with the following reaction:

$$CO_2+C=2CO$$

A conditional parameter is introduced, which can be determined only based on the empirical data—coefficient of CO$_2$ conversion.

| CO$_2$ Conversion in Gasification Process | |
|---|---|
| conversion degree | 0.5 |

9.2. Using the conversion coefficient in the calculation, one calculates an amount of reacting CO$_2$ and carbon, and amount of formed CO.

10. Hydrogasification.

10.1. Interaction of steam hypothetically takes place with carbon remaining after combustion and conversion of CO$_2$:

$$C+H_2O=CO+2H_2$$

This is the main reaction. In the real process, many other products are formed after hydrogasification, but their amount and effect are negligible.

10.2. The following types of water are considered: first is the moisture contained in the feedstock; second—added steam or water; third—water formed in the pyrolysis process. In certain cases, the initial moisture content in the feedstock can be sufficient or may exceed what is required.

| Reagent Supply | |
|---|---|
| excess of supplied water or steam, weight parts | 1 |

In this case, a calculation of water amount is performed, which water is necessary to be added.

| Gas | weight, g | volume, l |
|---|---|---|
| excess of steam + steam, which is added for 100% interaction | 9.25 | 11.51 |
| steam, which is added for 100% interaction | 9.25 | 11.51 |
| all reacting water | 137.04 | 170.54 |
| all reacting water + excess | 137.04 | |
| excessive moisture content. feedstock | 0 | |

11. Gases produced at the outlet of the gasifier.

11.1. The composition of gases produced at the outlet of the gasifier, weight, amount, calorie content and methane equivalent thereof are calculated. The calculation is based on the composition of the produced pyrolysis gases. Summarizing these data, gasification gases at the outlet of the reactor are calculated.

| Composition of Output Gas | | | | |
|---|---|---|---|---|
| Gas | Volume | Weight | % vol. | % vol., dry gas |
| H$_2$ | 629.56 | 56.21 | 27.81 | 27.81 |
| CO | 678.19 | 847.74 | 29.96 | 29.96 |
| CO$_2$ | 98.19 | 192.87 | 4.34 | 4.34 |
| H$_2$S | 3.57 | 5.42 | 0.16 | 0.16 |
| H$_2$O | 0 | 0 | 0 | |
| N$_2$ | 747.92 | 934.91 | 33.04 | 33.04 |
| CH$_4$ | 106.54 | 76.1 | 4.71 | 4.70 |
| Sum | 2263.98 | 2113.247238 | 100 | 100 |
| Calorie content | 8473.03 | | kJ/m$^3$ | |
| methane equivalent | 0.24 | m$^3$ methane/1 m$^3$ of gas | | |
| methane equivalent | 0.53 | m$^3$ methane/1 kg SHW preliminary dried | | |

12. Energy losses.

In this case, the following energy losses are considered: 1) endothermic reaction effects; 2) heat loss related to slag removal; 3) gasifier design losses; 4) losses associated with hot gases produced by the gasifier; 5) losses associated with steam generation from unreacting water.

12.1 Thermal reaction effects reference data on combustion heat of individual substances are used and calculations of the thermal reaction effects are performed partially:

reaction thermal energy of the feedstock pyrolysis; 2) $C+H_2O=CO+H_2$; 3) $C+CO_2=2CO$;

| Reaction Thermal Effects | |
|---|---|
| reaction thermal energy of residual carbon pyrolysis kJ/mol | 5.39 |
| reaction thermal energy $C + H_2O = CO + H_2$, kJ/mol | −117.1 |
| reaction thermal energy $C + CO_2 = 2CO$, kJ/mol | −161.2 |

12.2. Based on the calculated thermal reaction effects and on the known amount of the reacting substance, an amount of thermal energy is calculated, which either absorbed or evolved during these reactions. After that, a summarized (total) amount of thermal energy for all reactions is calculated. In this case, the absorption of a large amount of thermal energy is observed.

| | |
|---|---|
| heat energy due to the pyrolysis, kJ | 212.55 |
| heat energy of the reaction $C + H_2O = CO + H_2$, kJ | −891.52 |
| heat energy of the reaction $C + CO_2 = 2CO$, kJ | −706.62 |
| total thermal effect of reactions, kJ | −1385.55 |

12.3. Thermal loss associated with slag removal.

Based on the calculated heat capacity, an average morphological structure of slag and on the known amount and temperature thereof, the calculation of heat loss associated with slag removal from the gasifier is performed.

| Heating of Inorganic Feedstock | |
|---|---|
| average heat capacity, J/g*K | 0.76 |
| temperature in the gasifier, ° C. | 1100 |
| weight of inorganic portion, entered into the reactor, g | 100 |
| Q2 - consumptions for heating of inorganic feedstock, kJ | −104.58 |

12.4. Losses associated with the design of the gasifier.

The heat loss through the vessel structure of the gasifier depends on many factors and is extremely complex for a detailed and accurate calculation. In this case, it assumed that these losses comprise 5% relative to the total energy amount entered into the reactor.

| | |
|---|---|
| Design Loss, % | 5 |
| Q3 - constructional loss, kJ | −1068.24 |

12.5. Heat energy removed from the reactor together with gasification gases.

For each gas composition, heat capacity is calculated based on the known reference coefficients. Using the calculated gas amounts and the temperature thereof at the exit from the gasifier, one determines an amount of thermal energy removed at their cooling down to 25° C.

| Heat of Gasification Gases | |
|---|---|
| temperature of gasification gases, ° C. | 350 |
| gas heat capacity at 600° C. | 1.36 |
| gas heat capacity at 25° C. | 1.29 |
| heat energy, evolving with gases, kJ | −1008.0 |

12.6. In case of entry of excess moisture into the gasifier, it is also necessary to take into account energy consumption for steam formation from such moisture.

There is no water excess in this example.

| Steam Formation of Excessive Moisture or Unreacting Water | |
|---|---|
| weight of excessive water, kg | 0 |
| water heat capacity, kJ/kg$^3$K | 4.18 |
| thermal effect of phase income, kJ/mol | 43.8 |
| energy consumption for water heating from 25° C. to 100° C., kJ | 0 |
| consumptions for steam formation, kJ | 0 |
| Q5 - total consumptions for steam obtaining, kJ | 0 |

12.7. All heat losses of gasifier are summarized.

| | |
|---|---|
| Total Losses (excluding thermal effects of reactions), kJ | −2,180.82 |
| Total Losses (together with endothermic effects of reactions), kJ | −3,566 |

13. Compensation of the energy loss.

The compensation is performed due to the thermal energy evolved during carbon burning (see 8.6). Thus, it is necessary to supply into the reactor an amount of air for which the amount of the evolved energy corresponds to the amount of the energy losses. Initially, an optional amount of air supply is assumed (see 8.4). After the calculation of the total energy losses, it is possible to determine the equality of the evolved energy after burning and the total energy loss by a trial-and-error method with changing of the amount of supplied air. Thus, the required amount of added air can be calculated.

14. A calculation of the amount of recuperated thermal energy of the gasification gases is performed taking into account that, after the recuperation, gases cool down to 40° C., and the losses due to heat transfer are 10%.

| | |
|---|---|
| temperature of evacuated gasification gas, ° C. | 350 |
| temperature, to which gases cool down, ° C. | 40 |
| gas heat capacity at 600° C. | 1.36 |
| gas heat capacity at 40° C. | 1.30 |
| coefficient of heat transfer at recuperation, % | 90 |
| Qp2 - recuperated heat, kJ | 866.86 |

15. Generation of electric energy.

Two options for electricity generation from gasification gases are considered in the comparative calculations:

1) The use of a gas-powered apparatus, with efficiency factor of 38.7%;

2) The use of a steam turbine, with efficiency factor of 20%.

The parameters of the gases being produced allow to consider the possibility of generating electric energy using the gas-powered apparatus.

| | |
|---|---|
| Efficiency factor, % | 38.7 |
| amount of thermal energy being obtained from gases, MJ | 19.18 |

| | |
|---|---|
| amount of thermal energy being obtained from gases, kWt hour | 5.33 |
| amount of electric energy being obtained, kWt hour | 2.062 |

16. The recuperation of thermal energy of flu gases after the gas-powered apparatus.

It is assumed in this calculation that from the total energy of gasification gases:

38.7% converts into electric energy;

41.3% converts into recuperated thermal energy as output hot water or process steam;

20% are the reactor design-associated loss and losses associated with the discharge of flu gases into the atmosphere (in this calculation the temperature of gases exiting from the heat exchanger is 250° C.).

| | |
|---|---|
| total amount of thermal energy, contained in the whole gas, kJ | 19182.74 |
| heat energy after obtaining of electric energy, kJ | 7922.47 |
| loss at recuperation of flu gases heat, % | 20 |
| loss at recuperation of flu gases heat, kJ | 3836.55 |
| obtained heat recuperated energy, kJ | 4085.92 |

17. Calculation of weight balance.

The input weight is the sum of weights of (a) feedstock being loaded, (b) supplied air, and (c) additionally supplied water or steam. The output weight consists of the weight of the produced gasification gases and slug weight.

| weight balance | |
|---|---|
| 2213.25 | input weight |
| 2213.25 | output weight, g |
| 100 | |
| 0 | error, % |

18. Energy balance

Input energy is the combustion heat of the feedstock loaded into the gasifier. Output energy is the sum of combustion heat of all produced gasification gases and all heat loss of the reactor (i.e., heat of gasification gases, apparatus losses, thermal energy being removed together with slag, etc.).

| | Energy balance | | | | | |
|---|---|---|---|---|---|---|
| | Input feedstock | Produced gases | Energy loss | sum of obtained energy | difference of input and output energy | Error, % |
| kJ | 21364.79 | 19182.74329 | 2180.824299 | 21363.56 | 1.227 | 0.0057468 |

The table below illustrates certain advantages of the technology of the instant invention in comparison to the previously known and used technologies.

| | | | Incinerators | Low-temperature pyrolysis chambers (to 700° C.) | High-temperature pyrolysis chambers (exceeding 700° C.) | Gassifiers of updraft gasification process (high-temperature gasification - 1000-1300° C.) | Combined technologies (high-temperature pyrolysis followed by the gasification of residual carbon in the gasification) | Downdraft gasification process |
|---|---|---|---|---|---|---|---|---|
| Gas | volume, 1 | | 4894 | 467 | 610 | 1680 | 722 | 2264 |
| | composition, | CO | | 8.91 | 24.64 | 21.61 | 26.64 | 29.96 |
| | % | $CO_2$ | 11.8 | 16.49 | 2.11 | 5.7 | 2.28 | 4.34 |
| | | $H_2$ | | 16.21 | 40.08 | 8.38 | 26.32 | 27.81 |
| | | $CH_4$ | | 32.72 | 11.48 | 10.56 | 20.56 | 4.71 |
| | | $H_2S$ | | | | 0.21 | | 0.16 |
| | | $N_2$ | 72.86 | 1.16 | 0.89 | 36.3 | 0.97 | 33.04 |
| | | $O_2$ | 1.76 | | | | | |
| | | $H_2O$ | 13.58 | 24.51 | 20.8 | 17.22 | 23.22 | 0 |
| Tarous residue | weight, g | | 200 | 240 | 96 | 200 | 136 | |
| | composition, | C | 66 | 66 | 66 | 66 | 66 | |
| | % | H | 7.6 | 7.6 | 7.6 | 7.6 | 7.6 | |
| | | O | 25 | 25 | 25 | 25 | 25 | |
| | | N | 1 | 1 | 1 | 1 | 1 | |
| | | S | 0.4 | 0.4 | 0.4 | 0.4 | 0.4 | |
| slag and carbon residue | weight, g | | 85.5 | 114.77 | 303.35 | 73 | 59.5 | 100 |
| | composition, | C | | 19.48 | 66.55 | | | |
| | % | H | | 1.97 | 0.93 | | | |
| | | O | | 4.89 | 2.21 | | | |
| | | N | | 0.71 | 0.31 | | | |
| | | S | | 3.47 | 1.49 | | | |
| | | Inorganics | 100 | 69.48 | 28.52 | 100 | 100 | 100 |

-continued

| | Incinerators | Low-temperature pyrolysis chambers (to 700° C.) | High-temperature pyrolysis chambers (exceeding 700° C.) | Gassifiers of updraft gasification process (high-temperature gasification - 1000-1300° C.) | Combined technologies (high-temperature pyrolysis followed by the gasification of residual carbon in the gasification) | Downdraft gasification process |
|---|---|---|---|---|---|---|
| fin weight, g | 45 | 135 | 45 | 90 | 135 | |
| dispersed composition, C | 70 | 85 | 70 | 70 | 70 | |
| residue, % Inorganics | 30 | 15 | 30 | 30 | 30 | |
| sustained with gases NOx | high | middle | middle | low | low | low |
| H₂S, SO₂ | high | high | high | high | middle | low |
| HCl | high | middle | high | high | high | low |
| Level of gas purification system | high | high | high | high | high | low |
| Used oxidizer | air | no | no | air, steam | air, steam | air, steam |
| level for Sorting preparation of | yes | yes | yes | yes | yes | yes |
| Drying household and industrial waste | partial | partial | partial | partial | partial | partial |
| Types of used energy apparatuses | steam turbine | steam turbine | steam turbine | steam turbine | steam turbine | gas powered machine |
| Efficiency factor, % | 20 | 20 | 20 | 20 | 20 | 38.7 |
| Amount of obtained electric energy, kWt/hour | 0.312 | 0.34 | 0.35 | 0.63 | 0.491 | 2.06 |
| Amount of produced thermal energy, kJ | 3372 | 3777 | 4793 | 6758 | 6586 | 7922 |
| Level of effect on environment | high | moderate | moderate | moderate | low | low |

While the disclosure above sets forth the principles of the present invention, with the examples given for illustration only, one should realize that the use of the present invention includes all usual variations, adaptations and/or modifications, within the scope of the claims attached as well as equivalents thereof.

Those skilled in the art will appreciate from the foregoing that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A downdraft gasification apparatus comprising:
   an elongated external vessel;
   an elongated internal vessel, wherein said internal vessel is located inside said external vessel, thereby forming a void between said internal vessel and said external vessel;
   a gasifier trunk, which is characterized by an axis and which comprises an inside surface, outside surface, an upper end and a lower end, a plurality of slits positioned substantially along the length of said gasifier trunk, wherein each of said plurality of slits is characterized by an upper slit end and a lower slit end, wherein at least one of said plurality of slits is characterized by a width at said lower slit end that is greater than a width at said upper slit end and wherein said gasifier trunk is further characterized by a cross-section of said lower end perpendicular to said axis and a cross-section of said upper end perpendicular to said axis, wherein said cross-section of said lower end is greater than said cross-section of said upper end;
   a loading mechanism, comprising an elongated loading mechanism trunk and a feedstock feeder for moving said feedstock along said elongated loading mechanism trunk, wherein said loading mechanism is positioned so as to enable the feeding of said feedstock into said upper end of said gasifier trunk and down toward said lower end of said gasifier trunk,
   a fire chamber, positioned below said lower end of said gasifier trunk, wherein said fire chamber is configured to allow products of said feedstock to enter said fire chamber after passing through said gasifier trunk,
   a gas outlet, and
   a slag discharge mechanism positioned adjacent to said lower end of said external vessel.

2. The apparatus of claim 1, wherein a damping chamber is formed between said gasifier trunk and said elongated internal vessel.

3. The apparatus of claim 2, wherein said damping chamber is formed so as to channel gases from said feedstock into said fire chamber.

4. The apparatus of claim 3, further comprising
   at least one rigidity rib located on said outside surface of said gasifier trunk between adjacent slits of said plurality of slits, wherein said at least one rigidity rib is positioned substantially along said gasifier trunk;
   at least one feedstock breaker located on said inside surface of said gasifier trunk immediately above said fire chamber;
   at least one rigidity structure positioned on said outside surface of said gasifier trunk so as to counter the pressure from said feedstock as it is moving inside said gasifier trunk.

5. The apparatus of claim 1, wherein said slag discharge mechanism further comprises a slag scraper, an air cooling system, and a water cooling system.

6. The apparatus of claim 1 further comprising a gas turbulator located between said elongated external vessel and said elongated internal vessel.

7. The apparatus of claim 1, wherein said feedstock feeder is a piston.

* * * * *